United States Patent [19]
Okada

[11] Patent Number: 5,497,668
[45] Date of Patent: Mar. 12, 1996

[54] METHOD OF TESTING THE OPERATION OF AN APPARATUS FOR DETECTING ACCELERATION

[76] Inventor: Kazuhiro Okada, 73, Sugaya 4-Chome, Ageo-Shi, Saitama 362, Japan

[21] Appl. No.: 298,924

[22] Filed: Aug. 31, 1994

Related U.S. Application Data

[62] Division of Ser. No. 952,753, Nov. 30, 1992.

[51] Int. Cl.$^6$ .................................................. G01L 1/04
[52] U.S. Cl. .................................. 73/862.626; 73/514.32
[58] Field of Search .................... 73/862.626, 862.68, 73/517 B, 10

[56] References Cited

U.S. PATENT DOCUMENTS

| | | |
|---|---|---|
| 4,634,965 | 1/1987 | Foote . |
| 4,679,434 | 7/1987 | Stewart ................................ 73/517 B |
| 4,950,914 | 8/1990 | Kurihara ................................ 307/10.1 |
| 4,987,779 | 1/1991 | McBrien ................................ 73/517 B |
| 5,054,320 | 10/1991 | Yuon .................................... 73/517 B |

FOREIGN PATENT DOCUMENTS

| | | |
|---|---|---|
| 0461265 | of 0000 | European Pat. Off. . |
| 0368446 | of 0000 | European Pat. Off. . |

OTHER PUBLICATIONS

H. U. Allen, et al. Beschleunigungsmesser Mit Selbsttest, p. 31, left column, para. 3, right col. last page–p. 32 middle col. para 2, right col, last page; Figs. 3, 4, 8, und–oder–Nor–Steverungstechnik, vol. 23, No. 3, Mar. 1990, Mainz DE, pp. 30–33.

*Primary Examiner*—Richard Chilcot
*Assistant Examiner*—Ronald Biegel
*Attorney, Agent, or Firm*—Ladas & Parry

[57] ABSTRACT

A fixed substrate (10) having rigidity and a flexible substrate (20) having flexibility are arranged in such a manner that they are opposite to each other. Both the substrates are fixed at their peripheral portions by a detector casing (40). A working body (30) is connected onto the lower surface of the flexible substrate. Test electrodes (11t, 13t, 15t) are formed on the lower surface of the fixed substrate, and fixed electrodes (11, 13, 15) are further formed through an insulating layer (16). Displacement electrodes (21, 23, 25) are formed on the upper surface of the flexible substrate. When an acceleration is exerted on the working body, the flexible substrate is bent, so the distance between the fixed electrode and the displacement electrode is varied. By detecting the change of distance as a change of the electrostatic capacitance between both the electrodes, it is possible to detect an acceleration exerted. In order to carry out the operation test of this detector, a voltage is applied across the test electrode and the displacement electrode, thus allowing coulomb force to be exerted between both the electrodes. Thus, the flexible substrate is bent by coulomb force, resulting in the same state as the state where an acceleration is exerted. By examining a change of the electrostatic capacitance between the fixed electrode and the displacement electrode, the operation test can be conducted.

14 Claims, 12 Drawing Sheets

METHOD OF TESTING THE OPERATION OF AN APPARATUS FOR DETECTING ACCELERATION

This is a divisional of copending application Ser. No. 07/952,753 filed on Nov. 30, 1992 & International Application PCT/JP91/00428 filed on Mar. 30, 1991 and which designated the U.S.

TECHNICAL FIELD

This invention relates to a method of testing the operation of an apparatus for detecting a physical quantity such as force, acceleration or magnetism, etc. utilizing changes in distance between electrodes, and further relates to a detector for a physical quantity such as force, acceleration, or magnetism, etc., having a function to carry out such an operation test method.

BACKGROUND ART

In the automobile industory or the machinery industory, there has been increased demand for detectors capable of precisely detecting a physical quantity such as force, acceleration or magnetism. Particularly, it is required to realize small detectors capable of detecting physical quantities every respective two dimensional or three dimensional components.

To meet such a demand, there has been proposed a force detector in which gauge resistors are formed on a semiconductor substrate such as silicon, etc. to transform a mechanical distortion the produced in the substrate on the basis of a force applied from the external to an electric signal by making use of the piezo resistance effect. When a weight body is attached to the detecting unit of the force detector, an acceleration detector for detecting, as a force, an acceleration applied to the weight body can be realized. Further, when a magnetic body is attached to the detecting unit of the force detector, a magnetic detector for detecting, as a force, a magnetism exerted on the magnetic body can be realized. For example, in U.S. Pat. No. 4,905,523, U.S. Pat. No. 4,967,605, U.S. Pat. No. 4,969,366, detectors for force, acceleration or magnetism according to the invention by the inventor of this application are disclosed.

In place of the above described detectors utilizing the piezo resistance effect, detectors utilizing changes in distance between electrodes are proposed. For example, in the Japanese Patent Application No. 274299/90 specification, there is disclosed a detector of a simple structure including two substrates oppositely arranged and electrodes formed on respective substrates. In this detector, one substrate is allowed to be subjected to displacement on the basis of a physical action such as force, acceleration, or magnetism, etc. to be detected. An applied force changes the distance between electrodes formed on both the substrates. By this displacement the applied force is detected as a change of an electrostatic capacity between both the electrodes. Alternatively, there is also disclosed a method in which a piezo electric element is put between both electrodes to detect a change of the distance between the electrodes as a voltage produced from the piezo electric element. If an external force is directly exerted to one substrate, this detector functions as a force detector for detecting an external force exerted. Further, if a weight body is connected to one substrate so that the substrate is subjected to displacement on the basis of an acceleration exerted on the weight body, this detector functions as an acceleration detector for detecting an acceleration exerted. In addition, if a magnetic body is connected to one substrate so that the substrate is subjected to displacement on the basis of a magnetism exerted on the magnetic body, this detector functions as a magnetic detector for detecting a magnetism exerted.

Generally, in the case of providing apparatuses for detecting any physical quantity as commercial products, there takes place the necessity of carrying out an operation test as to whether or not this detector outputs a correct detection signal. As such an operation test, there is adopted a method of actually exerting a physical quantity to be detected on that detector to examine a detection signal at that time. For example, in the case of an acceleration detector, there is employed a method of actually applying, from a predetermined direction, an acceleration of a predetermined magnitude to the detector to judge whether or not a detection signal at that time is a correct one corresponding to the applied acceleration. However, in order to carry out such an operation test, a test equipment exclusively used therefor is required, and the test work is complicated or troublesome, requiring much time. Especially, the quantity of detectors which can be tested by an exclusive test equipment is limited, resulting in lowered productivity. Accordingly, such a conventional test method is not suitable as the method of testing the operation of detectors mass produced.

A first object of this invention is to provide a method capable of conducting a simple operation test of apparatuses for detecting a physical quantity utilizing changes in distance between electrodes, and a second object thereof is to provide a detector having a self diagnostic function by this simple operation test method.

DISCLOSURE OF INVENTION

<Operation test method>

An operation test method according to this invention is directed to a method for testing the operation of a detector including a displacement electrode supported so that it can be subjected to displacement by application of an external force, a fixed electrode fixed to a detector casing at a position opposite to the displacement electrode, and detection means for taking out, as an electric signal, a change of a distance between both the eletrodes, thus to detect a physical quantity corresponding to the external force as an electric signal. This operation test can be grasped in a manner classified into four methods as described below:

(1) The first method of the operation test according to this invention resides in a method of applying a predetermined voltage across the fixed electrode and the displacement electrode, allowing the displacement electrode to be subjected to displacement by a coulomb force produced on the basis of the applied voltage, and comparing an electric signal detected by the detection means in this displacement state with the applied voltage to thereby test the operation of this detector.

(2) The second method of the operation test according to this invention resides in a method in which there is further provided a test electrode fixed to the detector casing at a position opposite to the displacement electrode, the method comprising the steps of applying a predetermined voltage across the test electrode and the displacement electrode, allowing the displacement electrode to be subjected to displacement by a coulomb force produced on the basis of the applied voltage, and comparing an electric signal detected by the detection means in this displacement state with the applied voltage to thereby test the operation of this detector.

(3) The third method of the operation test according to this invention resides in a method in which there is further provided a test electrode supported so that it can be subjected to displacement together with the displacement electrode, the method comprising the steps of applying a predetermined voltage across the test electrode and the fixed electrode, allowing the displacement electrode to be subjected to displacement by a coulomb force produced on the basis of the applied voltage, and comparing an electric signal detected by the detection means in this displacement state with the applied voltage to thereby test the operation of this detector.

(4) The fourth method of the operation test according to this invention is resides in a method in which there are further provided a first test electrode supported so that it can be subjected to displacement together with the displacement electrode and a second test electrode fixed to the detector casing at a position opposite to the first test electrode, the method comprising the steps of applying a predetermined voltage across the first and second test electrodes, allowing the displacement electrode to be subjected to displacement by a coulomb force produced on the basis of the applied voltage, and comparing an electric signal detected by the detection means in this displacement state with the applied voltage to thereby test the operation of this detector.

<Application to an electrostatic capacitance type detector>

In accordance with this invention, by applying the above described operation test method to a physical quantity detector of the type for detecting changes in the distance between electrodes as changes in the electrostatic capacitance, three detectors having a self diagnostic function which will be described below can be realized.

(1) A first detector comprises:

a flexible substrate including a fixed portion fixed to a detector casing, a working portion adapted to receive a force based on a physical action such as force, acceleration or magnetism from the external, and a flexible portion having flexibility formed between the fixed portion and the working portion;

a fixed substrate fixed to the detector casing so as to oppose or face the flexible substarte;

a displacement electrode formed at a position where a displacement is produced by bending of the flexible substrate;

a fixed electrode fixed to the fixed substrate and formed at a position opposite to the displacement electrode;

a test electrode fixed to the detector casing at a position opposite to the displacement electrode and electrically insulated from the fixed electrode;

detection means for outputting, as an electric signal, a change of an electrostatic capacitance produced between the displacement electrode and the fixed electrode; and voltage application means for applying a predetermined voltage across the test electrode and the displacement electrode, to detect a force exerted on the working portion on the basis of an electric signal outputted from the detection means, and to compare the electric signal outputted from the detection means with the applied voltage applied by the voltage application means, thus making it possible to carry out the operation test.

(2) The second detector comprises:

a flexible substrate including a fixed portion fixed to a detector casing, a working portion adapted to receive a force based on a physical action such as force, acceleration or magnetism, etc. from the external, and a flexible portion having flexibility formed between the fixed portion and the working portion;

a fixed substrate fixed to the detector casing so as to oppose or face the flexible substrate;

a displacement electrode formed at a position where a displacement is produced by bending of the flexible substrate;

a fixed electrode fixed by the fixed substrate and formed at a position opposite to the displacement electrode;

a test electrode subjected to displacement together with the displacement electrode at a position opposite to the fixed electrode, and electrically insulated from the displacement electrode;

detection means for outputting, as an electric signal, a change of an electrostatic capacitance produced between the displacement electrode and the fixed electrode; and voltage application means for applying a predetermined voltage across the test electrode and the fixed electrode, to detect a force exerted on the working portion on the basis of an electric signal outputted from the detection means, and to compare the electric signal outputted from the detection means with the applied voltage applied by the voltage application means, thereby making it possible to carry out the operation test.

(3) The third detector comprises:

a flexible substrate including a fixed portion fixed to a detector casing, a working portion adapted to receive a force based on a physical action such as force, acceleration or magnetism, etc. from the external, and a flexible portion having flexibility formed between the fixed portion and the working portion;

a fixed substrate fixed to the detector casing so as to oppose or face the flexible substrate;

a displacement electrode formed at a position where a displacement is produced by bending of the flexible substrate;

a fixed electrode fixed by the fixed substrate and formed at a position opposite to the displacement electrode;

a first test electrode formed so that the flexible substrate is bent on the basis of displacement of the first test electrode itself;

a second test electrode fixed to the detector casing at a position opposite to the first test electrode and electrically insulated from the fixed electrode;

detection means for outputting, as an electric signal, a change of an electrostatic capacitance produced between the displacement electrode and the fixed electrode; and voltage application means for applying a predetermined voltage across the first and second test electrodes, to detect a force exerted on the working portion on the basis of the electric signal outputted from the detection means, and to compare the electric signal outputted from the detection means with the applied voltage applied by the voltage application means, thereby making it possible to carry out the operation test.

<Application to piezo electric type detector>

Further, in accordance with this invention, by applying the above described operation test method to a physical quantity detector of the type for detecting changes in distance between electrodes by using a piezo electric element, three detectors having a self diagnostic function which will be described below can be realized.

(1) The first detector comprises:

a flexible substrate including a fixed portion fixed to a detector casing, a working portion adapted to receive a force based on a physical action such as force, acceleration or magnetism, etc. from the external, and a flexible portion having flexibility formed between the fixed portion and the working portion;

a fixed substrate fixed to the detector casing so as to oppose or face the flexible substrate;

a displacement electrode formed at a position where a displacement is produced by bending of the flexible substrate;

a fixed electrode fixed by the fixed substrate;

a piezo electric element arranged in a manner that it is put between the flexible substrate and the fixed substrate, and for transforming a pressure applied by both the substrates to an electric signal to output that signal to both the electrodes;

a test electrode fixed to the detector casing at a position opposite to the displacement electrode and electrically insulated from the fixed electrode; and voltage application means for applying a predetermined voltage across the test electrode and the displacement electrode, to detect a force exerted on the working portion on the basis of an electric signal outputted from the piezo electric element, and to compare the electric signal outputted from the piezo electric element with the applied voltage applied by the voltge application means, thereby making it possible to carry out the operation test.

(2) The second detector comprises:

a flexible substrate including a fixed portion fixed to a detector casing, a working portion adapted to receive a force based on a physical action such as force, acceleration or magnetism, etc. from the external, and a flexible portion having flexibility formed between the fixed portion and the working portion;

a fixed substrate fixed to the detector casing so as to oppose or face the flexible substrate;

a displacement electrode formed at a position where a displacement is produced by bending of the flexible substrate;

a fixed electrode fixed by the fixed substrate;

a piezo electric element arranged in a manner that it is put between the flexible substrate and the fixed substrate, and for transforming a pressure applied by the both substrates to output that signal to the both electrodes;

a test electrode subjected to displacement together with the displacement electrode at a position opposite to the fixed electrode, and electrically insulated from the displacement electrode; and voltage application means for applying a predetermined voltage across the test electrode and the fixed electrode, to detect a force exerted on the working portion on the basis of electric signal outputted from the piezo electric element, and to compare the electric signal outputted from the piezo electric element with the applied voltage applied by the application means, thereby making it possible to carry out the operation test.

(3) The third detector comprises:

a flexible substrate including a fixed portion fixed to a detector casing, a working portion adapted to receive a force based on a physical action such as force, acceleration or magnetism, etc. from the external, and a flexible portion having flexibility formed between the fixed portion and the working portion;

a fixed substrate fixed to the detector casing so as to oppose or face the flexible substrate;

a displacement electrode formed at a position where a displacement is produced by bending of the flexible substrate;

a fixed electrode fixed by the fixed substrate;

a piezo electric element arranged in a manner that it is put between the flexible substrate and the fixed substrate, and for transforming a pressure applied by the both substrates to an electric signal to output that signal to both the electrodes;

a first test electrode formed so that the flexible substrate is bent on the basis of displacement of the first test electrode itself, and electrically insulated from the displacement electrode;

a second test electrode fixed to the detector casing at a position opposite to the first test electrode, and electrically insulated from the fixed electrode; and voltage application means for applying a predetermined voltage across the first and second test electrodes, to detect a force exerted on the working portion on the basis of the electric signal outputted from the piezo electric element, and to compare the electric signal outputted from the piezo electric element with the applied voltage applied by the voltage application means, thereby making it possible to carry out the operation test.

<Detector for carrying out detection by difference>

Further, a further detector according to this invention comprises:

a flexible substrate including a fixed portion fixed to a detector casing, a working portion adapted to receive a force based on a physical action from the external, and a flexible portion having flexibility formed between the fixed portion and the working portion;

a first fixed substrate fixed to the detector casing so as to oppose or face a first plane of the flexible substrate;

a second fixed substrate fixed to the detector casing so as to oppose or face a second plane of the flexible substrate;

a first displacement electrode formed on the first plane of the flexible substrate;

a second displacement electrode formed on the second plane of the flexible substrate;

a first fixed electrode fixed by the first fixed substrate and formed at a position opposite to the first displacement electrode;

a second fixed electrode fixed by the second fixed substrate and formed at a position opposite to the second displacement electrode; and detection means for outputting, as an electric signal, a difference between a change of an electrostatic capacitance produced between the first displacement electrode and the first fixed electrode and a change of an electrostatic capacitance produced between the second displacement electrode and the second fixed electrode, to detect a force exerted on the working portion on the basis of the electric signal outputted from the detection means.

BEST MODE FOR CARRYING OUT THE INVENTION

§1 Basic structure of the detector

Figure 1:
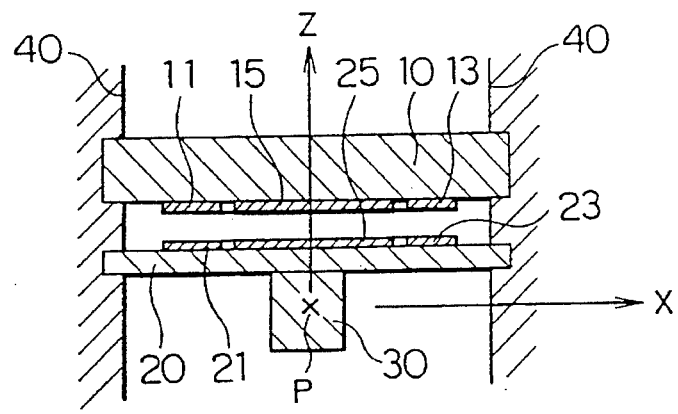
FIG. 1 is a side cross sectional view showing the basic structure of an acceleration detector of the electrostatic capacitance type to which a method of testing the operation according to this invention is applied.
Figure 2:
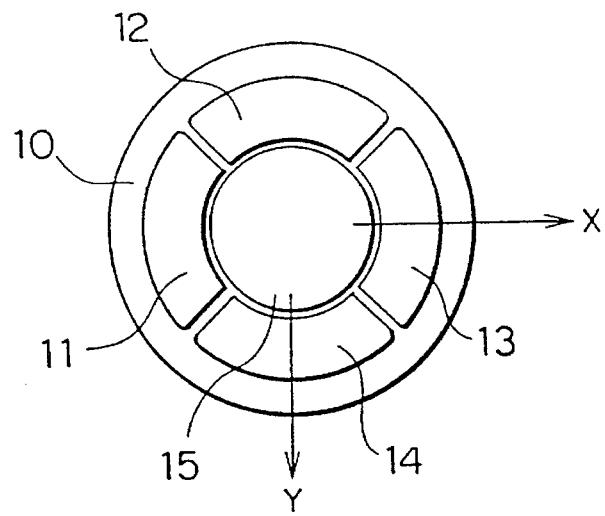
FIG. 2 is a bottom view of a fixed substrate 10 of the detector shown in FIG. 1. The cross section cut along the X-axis of the fixed substrate 10 of FIG. 2 is shown in FIG. 1.
Figure 3:
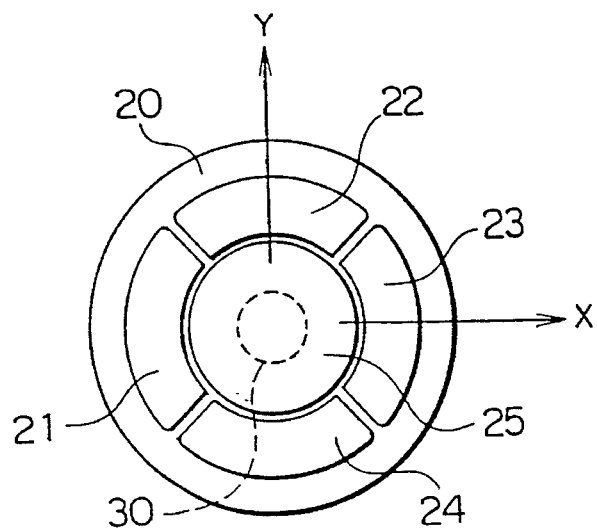
FIG. 3 is a top view of a flexible substrate 20 of the detector shown in FIG. 1. The cross section cut along the X-axis of the flexible substrate 20 is shown in FIG. 1.

Prior to the description of an operation test method according to this invention, the structure of a detector to which this invention is applied and the principle thereof will be briefly described. FIG. 1 is a side cross sectional view showing the basic structure of an acceleration detector to which this invention is applied. This detector comprises, as the major component, a fixed substrate 10, a flexible substrate 20, a working body 30, and a detector casing 40. The bottom view of the fixed substrate 10 is shown in FIG. 2. The cross section cut along the X-axis of the fixed substrate 10 in FIG. 2 is shown in FIG. 1. The fixed substrate 10 is formed as a disk shaped substrate as shown, and is fixed at the peripheral portion thereof to the detector casing 40. On the lower surface thereof, fan shaped fixed electrodes 11 to 14 and a disk shaped fixed electrode 15 are formed. On the other hand, the top view of the flexible substrate 20 is shown in FIG. 3. The cross section cut along the X-axis of the flexible substrate in FIG. 3 is shown in FIG. 1. The flexible substrate 20 is also formed as a disk shaped substrate as shown, and is fixed at the peripheral portion thereof to the detector casing 40. On the upper surface thereof, fan shaped displacement electrodes 21 to 24 and a disk shaped displacement electrode 25 are formed. The working body 30 is columnar as the upper surface thereof is indicated by broken lines in FIG. 3, and is coaxially connected to the lower surface of the flexible substrate 20. The detector casing 40 is cylindrical, and fixes and supports the peripheral portions of the fixed substrate 10 and the flexible substrate 20.

The fixed substrate 10 and the flexible substrate 20 are arranged with a predetermined spacing therebetween at positions in parallel to each other. While both substrates are a disk shaped substrate, the fixed substrate 10 is a substrate having high rigidity such that bending is difficult to occur, whereas the flexible substrate 20 is a substrate having flexibility such that when a force is applied, bending occurs. In the example shown in FIG. 1, the fixed substrate is caused to have high rigidity by allowing the thickness thereof to be thick, and the flexible substrate 20 is caused to have flexibility by allowing the thickness thereof to be thin. In addition to the above, they may be caused to have rigidity or flexibility by changing material thereof. Alternatively, by forming a groove in the substrate, or forming a through hole therein, such members may be caused to have flexibility. As long as the fixed substrate 10, the flexible substrate 20 and the working body 30 can perform their primary functions, they may be constituted with any material. For example, they may be constituted with semiconductor or glass, etc., or may be constituted with metal. It is to be noted that in the case where the fixed substrate 10 and the flexible substrate 20 are constituted with metal, it is necessary to adopt a method of forming insulating layers between the metal and the respective electrodes in order not to short circuit the electrodes, or similar methods. In addition, respective electrode layers may be constituted with any material as long as it has conductive property.

Figure 4:
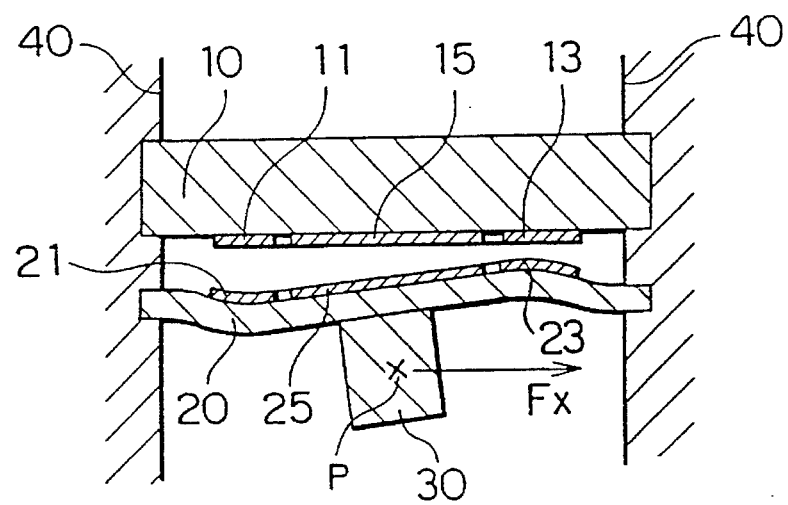
FIG. 4 is a side cross sectional view showing a bent state of the detector when a force Fx in an X-axis direction is exerted at the working point P of the detector shown in FIG. 1.
Figure 5:
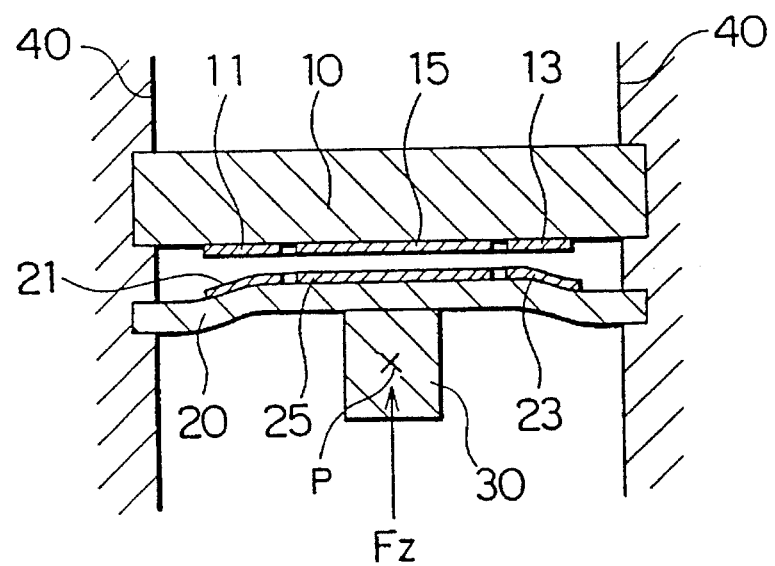
FIG. 5 is a side cross sectional view showing a bent state of the detector when a force Fz in a Z-axis direction is exerted on the working point P of the detector shown in FIG. 1.

It is now assumed that the working point P is defined at the center of gravity of the working body 30 as shown in FIG. 1, and that a XYZ-three-dimensional coordinate system having the working point P as the origin is defined as shown. Namely, the X-axis is defined in a right direction of FIG. 1, the Z-axis is defined in an upper direction thereof, and the Y-axis is defined in a direction perpendicular to the plane surface of paper and extending toward the back side of the plane surface of paper. If the central portion to which the working body 30 is connected, the peripheral portion fixed by the detector casing 40, and the portion therebetween of the flexible substrate 20 are respectively called a working portion, a fixed portion, and a flexible portion, when an acceleration is applied to the working body 30, bending is produced in the flexible portion, so the working portion is subjected to deviate from the fixed portion. Assuming now that the entirety of this detector is mounted, e.g., in an automotive vehicle, an acceleration will be applied to the working body 30 on the basis of running of the automotive vehicle. By this acceleration, an external force is exerted on the working point P. In the state where no force is exerted on the working point P, as shown in FIG. 1, the fixed electrodes 11 to 15 and the displacement electrodes 21 to 25 are maintained in a parallel state with a predetermined spacing therebetween. It is now assumed that combinations of the fixed electrodes 11 to 15 and the displacement electrodes opposite thereto are called capacitance elements C1 to C5, respectively. Now, when a force Fx in the X-axis direction is exerted on the working point P, this force Fx allows the flexible substrate 20 to produce a moment force. As a result, as shown in FIG. 4, bending will be produced in the flexible substrate 20. By this bending, the spacing between the displacement electrode 21 and the fixed electrode 11 is increased, but the spacing between the displacement electrode 23 and the fixed electrode 13 is decreased. When a force exerted on the working point P is assumed to be −Fx in an opposite direction, bending having the relationship opposite to the above will be produced. As stated above, when a force Fx or −Fx is exerted, any change appears in the electrostatic capacitance of the capacitance elements C1 and C3. Accordingly, by detecting this change, it is possible to detect the force Fx or −Fx. At this time, although respective spacings between displacement electrodes 22, 24 and 25 and fixed electrodes 12, 14 and 15 partially increase or decreace, their spacings may be assumed to be unchanged as a whole. On the other hand, in the case where a force Fy or −Fy in the Y direction is exerted, changes similar to the above are produced only in connection with the spacing between the displacement electrode 22 and the fixed electrode 12 and the spacing between the displacement electrode 24 and the fixed electrode 14. Further, in the case where a force Fz in the Z-axis direction is exerted, as shown in FIG. 5, the spacing between the displacement electrode 25 and the fixed electrode 15 becomes small. In contrast, in the case where a force −Fz in an opposite direction is exerted, this spacing becomes large. At this time, the spacings between the displacement electrodes 21 to 24 and the fixed electrodes 11 to 14 also become small or large. In this case the spacing between the displacement electrode 25 and the fixed electrode 15 most conspicuously varies. In view of this, by detecting the change of the electrostatic capacitance of the capacitance element C5, it is possible to detect the force Fz or −Fz.

When it is assumed that the electrode area, the electrode interval and the dielectric constant are represented by S, d and ε, respectively, the electrostatic capacitance C of the capacitance element is generally determined by the following equation:

$$C = \varepsilon S / d.$$

Accordingly, when the electrode interval becomes short, the electrostatic capacitance C becomes large, while when it becomes broad, the electrostatic capacitance C becomes small. This detector utilizes the above mentioned principle to measure changes in the electrostatic capacitance between respective electrodes, thus to detect an external force exerted on the working point P, i.e., an acceleration exerted. Namely, an acceleration in an X-axis direction is detected on the basis of changes in the capacitance between capacitance elements C1 and C3, an acceleration in a Y-axis direction is detected on the basis of changes in the capacitance between the capacitance elements C2 and C4, and an acceleration in a Z-axis direction is detected on the basis of changes in the capacitance of the capacitance element C5.

This invention relates to a method of testing the operation of the detector based on the above mentioned principle. It is to be noted that while the above described detector is of the electrostatic capacitance type, in the case of a detector of the piezo electric type, a piezo electric element is inserted between the flexible substrate and the fixed substrate. In this case, in place of detecting changes in the electrostatic capacitance, a voltage produced from the piezo electric element is detected.

§2 Method of testing the operation

Figure 6:
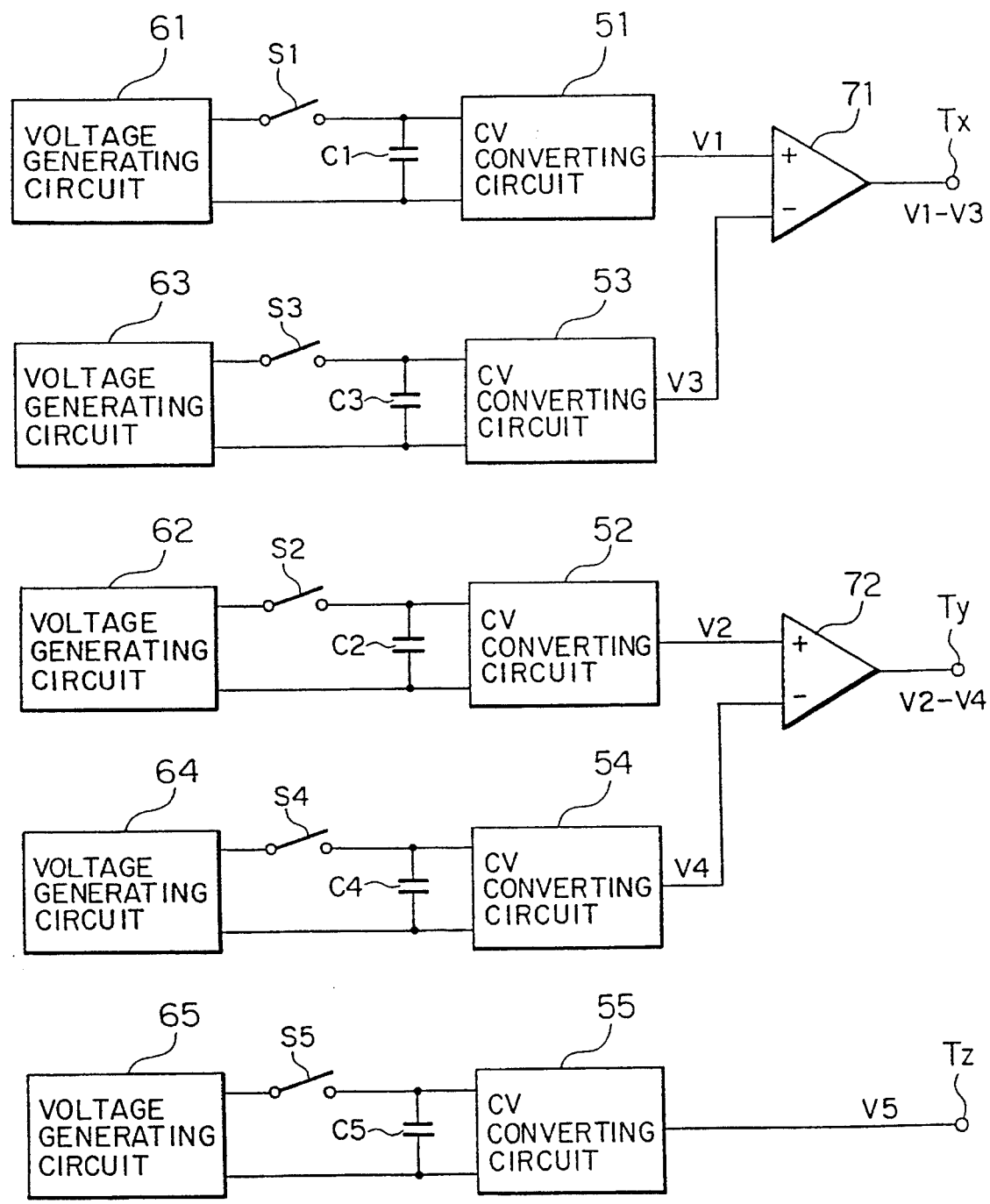
FIG. 6 is a circuit diagram showing a circuit for operating the detector shown in FIG. 1 and a circuit for implementing an operation test thereto.

A method of testing the operation according to this invention will now be described. FIG. 6 is a circuit for operating the detector shown in FIG. 1 and a circuit for implementing the operation test thereto. Here, capacitance elements C1 to C5 correspond to capacitance elements formed at the above described acceleration detector. For example, the capacitance element C1 is comprised of combination of the fixed electrode 11 and the displacement electrode 21. Further, CV converting circuits 51 to 55 connected to respective capacitance elements C1 to C5 have a function to convert electrostatic capacitance values C of respective capacitance elements to corresponding voltages V. Accordingly, voltage values V1 to V5 outputted from the CV converting circuits 51 to 55 take values proportional to electrostatic capacitance values of the capacitance elements C1 to C5. A differential amplifier 71 outputs a difference between voltage values V1 and V3 to the terminal Tx, and a differential amplifier 72 outputs a difference between voltage values V2 and V4 to the terminal Ty. Further, a voltage value V5 is outputted to the terminal Tz. By making reference to the explanation of the structure and the operation of the detector described in §1, it can be understood that a voltage (V1−V3) obtained on the terminal Tx becomes an acceleration detection value in an X-axis direction, a voltage (V2−V4) obtained on the terminal Ty becomes an acceleration detection value in a Y-axis direction, and a voltage V5 obtained on the terminal Tz becomes an acceleration detection value in a Z-axis direction.

It is to be noted that an acceleration in an X-axis or a Y-axis direction is detected by taking a difference between two voltages by the differential amplifier as described above. Such a detection based on difference can advantageously cancel an error (e.g., temperature error) resulting from the external environment. It is to be noted that while detection based on difference is not conducted in connection with an acceleration in a Z-axis direction, this will be described in the succeeding §4.

The CV converting circuits 51 to 55 and the differential amplifiers 71 and 72 which have been described are eventually circuits necessary for allowing this detector to carry out the detecting operation. The operation test according to this invention can be carried out by further adding voltage generating circuits 61 to 65 and test switches S1 to S5 to the above mentioned circuit. Any voltage generating circuits 61 to 65 may be employed as long as they are circuits capable of generating a desired voltage. For example, there may be employed such a circuit to convert digital data outputted from a microcomputer to an analog signal at a D/A converter.

Let now consider the case where test switches S1 and S2 are turned ON in the circuit shown in FIG. 6. At this time, if there is employed a circuit configuration such that charges having polarities opposite to each other are delivered from the voltage generating circuit 63 to both the electrodes of the capacitance element C3, one electrode is charged positive and the other electrode is charged negative between the fixed electrode 13 and the displacement electrode 23. For this reason, an attractive force based on coulomb force is exerted therebetween. Further, if there is employed a circuit configuration such that charges having the same polarity are delivered from the voltage generating circuit 61 to the both electrodes of the capacitance elenent C1, a repulsive force based on coulomb force is exerted therebetween. Thus, as shown in FIG. 4, the flexible substrate 20 will produce displacement. It is seen that this is the same state as the state where a force Fx in an X-axis direction is exerted on the working point P. In this state, detected voltages outputted to respective terminals Tx, Ty and Tz are examined to determine whether or not they are correct detected values indicating that the force Fx is exerted. Eventually, the operation test is carried out by applying voltages from the voltage generating circuits 61 and 63 to the capacitance elements C1 and C3 to thereby create the same state as the state where a force Fx in an X-axis direction is exerted on the working point P to examine detected voltages. If a correct relationship between an applied voltage and a detected voltage is determined in advance, a quantitative operation test can be conducted. In this operation test, there is no necessity of using vibrator, etc. to actually apply an acceleration to the working body 30. Namely, only by observing an electric signal outputted when an electric signal is inputted, the operation test is completed. Accordingly, the work becomes simple as compared to the conventional operation test, and is thus suitable for mass production. The test of the detecting operation of an acceleration in an −X axis direction may be conducted by applying voltages to capacitance elements C1 and C3 by using the switches S1 and S3. Further, the test of the detecting operation of an acceleration in a Y-axis direction may be conducted by applying voltages to capacitance elements C2 and C4 by using the switches S2 and S4. In addition, the test of the detecting operation of an acceleration in a Z-axis direction may be conducted by applying a voltage to the capacitance element C5 by using the switch S5.

Figure 7:
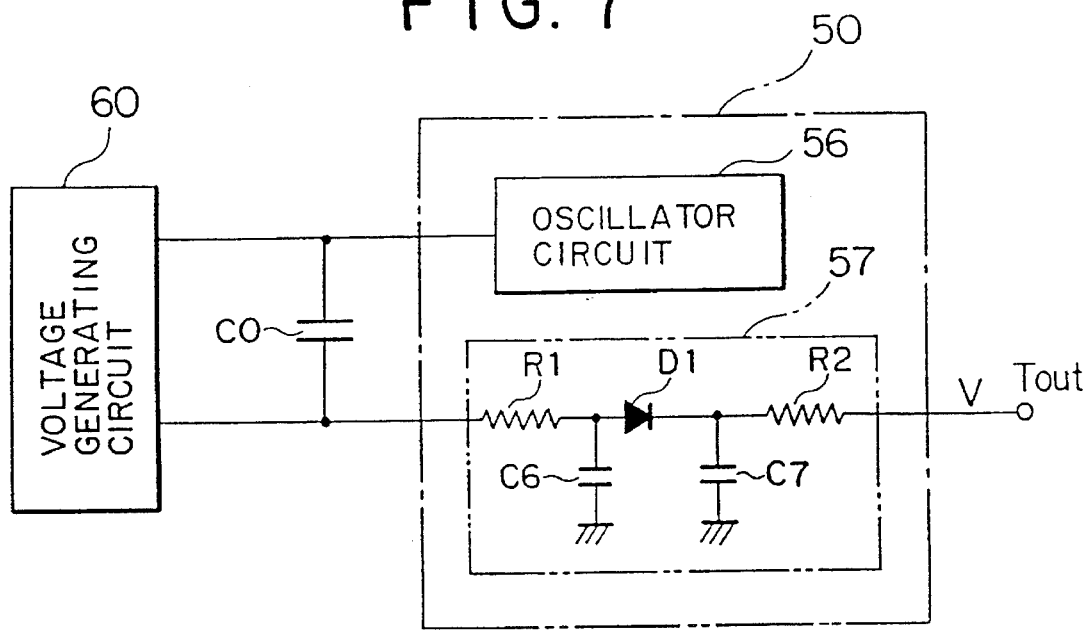
FIG. 7 is a circuit diagram showing an example of an actual circuit configuration of the CV converting circuit shown in FIG. 6.

In the circuit diagram shown in FIG. 6, it is preferable to employ a voltage generating circuit such that the capacitance values of circuits 61 to 65 viewed from the external are constant irrespective of voltages generated. Alternatively, a voltage generating circuit having a predetermined correlation between a voltage generated and a capacitance viewed from the external may be adopted. Since the voltage generating circuits 61 to 65 are connected in parallel with capacitance elements C1 to C5 when viewed from the circuit arrangement, if the capacitance values of the voltage generating circuits 61 to 65 vary at random, a correct operation test cannot be carried out. Further, it required for the CV converting circuits 51 to 55 to detect electrostatic capacitance values of the capacitance elements C1 to C5 without undergoing the influence of voltages applied by the voltage generating circuits 61 to 65. An example of a CV converting circuit having such a function is shown in FIG. 7. The CV converting circuit 50 shown here has a function to convert an electrostatic capacitance C of a capacitance element C0 to a voltage V to output it to the terminal Tout. It is here noted that a voltage is applied from the voltage generating circuit 60 to the capacitance element C0. The CV converting circuit 50 is comprised of an oscillator circuit 56 and a rectifier circuit 57. The oscillator circuit 56 generates an a.c. signal of a predetermined frequency to apply it to the capacitance element C0. The rectifier circuit 57 is comprised of resistors R1 and R2, capacitors C6 and C7, and a diode D1, and serves to convert an electrostatic capacitance C of the capacitance element C0 supplied with the a.c. signal to a voltage V to output it. The CV converting circuit 50 thus constructed can convert an electrostatic capacitance C of the capacitance element C0 to a voltage V without undergoing the influence of an applied voltage from the voltage generating circuit 60. It is to be noted that the circuit of FIG. 7 is illustrated as an example, and various circuits can be therefore applied for the CV converting circuit in addition thereto.

Figure 8:
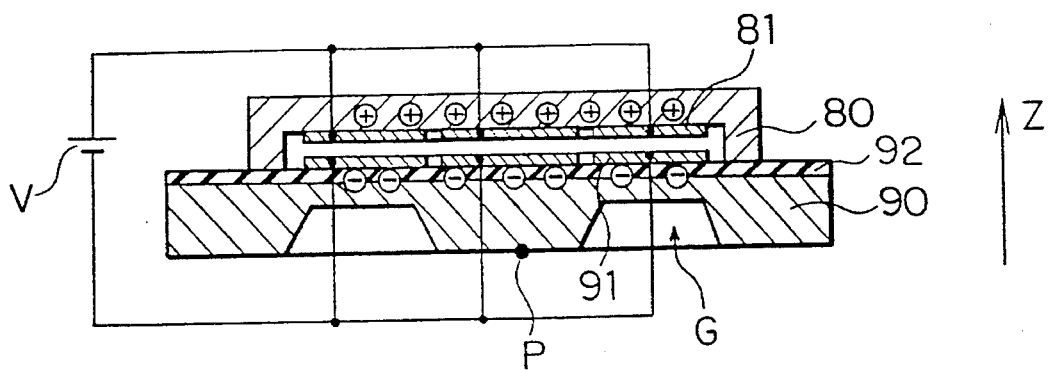
FIG. 8 is a side cross sectional view showing an actual test method with respect to the detecting operation in a positive Z-axis direction.

The operation test according to this invention will now be described in connection with a further actual embodiment. FIG. 8 is a side cross sectional view showing an actual test method with respect to the operation for detecting a force in a positive Z-axis direction. This detector is comprised of a fixed substrate 80 and a flexible substrate 90. At the bottom surface of the flexible substrate 90, a doughnut shaped groove G is dug. The thickness of the portion where the groove G is dug is thinner than those of other portions. Thus, the flexible substrate 90 is caused to have flexibility at this portion. The fixed substrate 80 is connected or bonded to the upper surface of the flexible substrate 90 with a predetermined space being kept therebetween in a manner to cover the upper surface of the flexible substrate 90. A plurality of fixed electrodes 81 and a plurality of displacement electrodes 91 are formed at positions opposite to each other on the lower surface of the fixed substrate 80 and the upper surface of the flexible substrate 90, respectively. In this embodiment, the fixed substrate 80 and the flexible substrate 90 are comprised of a glass substrate and a silicon substrate, respectively. The fixed electrodes 81 and the displacement electrodes 91 are comprised of aluminum layers formed on the respective substrates. Further, between the flexible substrate 90 and the displacement electrodes 91, an insulating layer 92 such as a silicon oxide film or a silicon nitride film is formed. In such a detector, in order to make a state which is equivalent to the state where a force in a positive Z-axis direction is exerted on the working point P, it is sufficient to exert an attractive force based on coulomb force between the fixed electrodes 81 and the displacement electrodes 91. FIG. 8 shows a method of applying a voltage in this case. Namely, when positive charges and negative charges are respectively given to the fixed electeodes 81 and the displacement electrodes 91 by means of power supply V, an attractive force is exerted therebetween. As a result, the operation test in the state where a force in a positive Z-axis direction is exerted on the working point P can be conducted.

Figure 9:
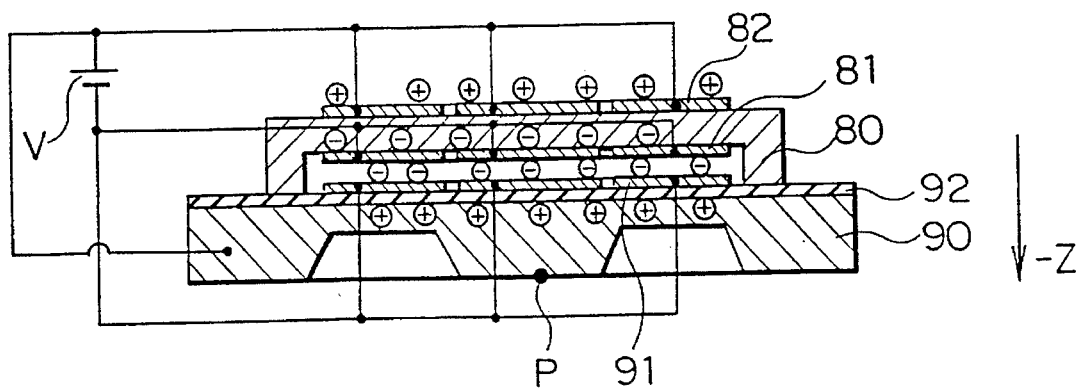
FIG. 9 is a side cross sectional view showing an actual test method with respect to the detecting operation in a negative Z-axis direction.

It is to be noted that, in order to make a state which is equivalent to the state where a force in a negative Z-axis direction is exerted on the working point P, it is required to change somewhat the structure of the detector itself. Namely, as shown in FIG. 9, a plurality of auxiliary electrodes 82 are formed on the upper surface of the fixed electrode 80. Here, by using the power supply V, positive charges are given to the auxiliary electrodes 82 and the flexible substrate 90 (silicon substrate) and negative charges are given to the fixed electrodes 81 and the displacement electrodes 91. Thus, polarization takes place between the auxiliary electrodes 82 and the fixed electrodes 81, and polarization takes place between the displacement electrodes 91 and the flexible substrate 90. As a result, respective portions are charged so that they have polarities as shown. Eventually, a repulsive force based on coulomb force is exerted between the fixed electrodes 81 and the displacement elctrodes 91, resulting in the state where a force in a negative Z-axis direction is exerted on the working point P.

In the operation test in the state where an attractive force is exerted between both members, this test can be sufficiently conducted only by two electrodes which directly exert coulomb force. However, in the operation test in the state where a repulsive force is exerted therebetween, it is required to additionally form an auxiliary electrode. It is to be noted that since the description of the structure becomes complicated, the description of this auxiliary electrode will be omitted in the following respective embodiments.

§3 Detector having an operation test function

In the above described embodiment, the electrode pair for generating coulomb force and the electrode pair for constituting a capacitance element are the same electrode pair. Namely, the electrode pair for generating coulomb force is a pair of the fixed electrode (11 to 15, 81) and the displacement electrode (21 to 25, 82), and the electrode pair for constituting a capacitance element is exactly the same electrode pair. If the same pairs are commonly used in this way, although there is the advantage that it is unnecessary to form another electrode for the operation test, there is the drawback that there occurs limit in the degree of test and the circuit for test becomes complicated. Particularly, in order for such equipment to circulate as goods on the market, it is convenient that a detection terminal for outputting a detection signal of a physical quantity and a test terminal for applying a voltage for test are separately provided. In the detector disclosed below, test electrodes are formed in advance, and an electrode pair for generating coulomb force and an electrode pair for constituting a capacitance element are constructed by separate electrode pairs.

Figure 10A:
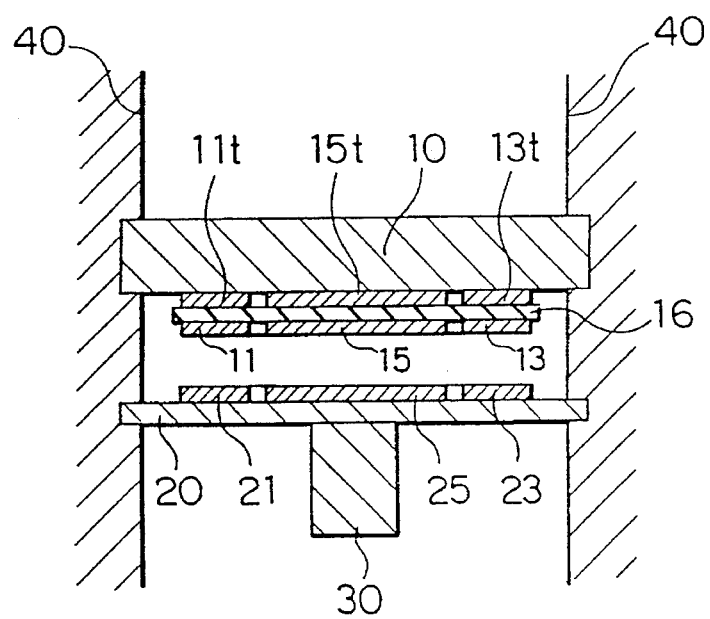
FIGS. 10a and 10b are side cross sectional views of an acceleration detector of the electrostatic capacitance type in which the operation test method according to this invention is carried out to thereby provide a function to carry out a self diagnosis.

FIG. 10a is a side cross sectional view of an acceleration detector provided with a test electrode for carrying out an operation test method according to this invention. The basic structure is the same as the acceleration detector shown in FIG. 1 wherein a fixed substrate 10 and a flexible substrate 20 are oppositely provided, and respective substrates are fixed at their periphery thereof to a detector casing 40. The fixed substrate 10 is a substrate having rigidity, but the flexible substrate 20 is thin in thickness thus to have flexibility. On the upper surface of the flexible substarte 20, five displacement electrodes 21 to 25 as shown in FIG. 3 are formed. On the other hand, on the lower surface of the fixed substrate 10, five test electrodes 11t to 15t are formed, and five fixed electrodes 11 to 15 are further formed through an insulating layer 16. The planar arrangement of the five fixed electrodes 11t to 15t and the planar arrangement of the five fixed electrodes 11 to 15 are the same as the electrode arrangement shown in FIG. 2. In such a structure, the electrode pairs for constituting capacitance elements C1 to C5 is an electrode pairs of the fixed electrodes 11 to 15 and the displacement electrodes 21 to 25, but the electrode pairs for generating coulomb force are pairs of the test electrodes 11t to 15t and the displacement electrodes 21 to 25. In these electrode pairs, displacement electrodes are commonly used.

Figure 10B:
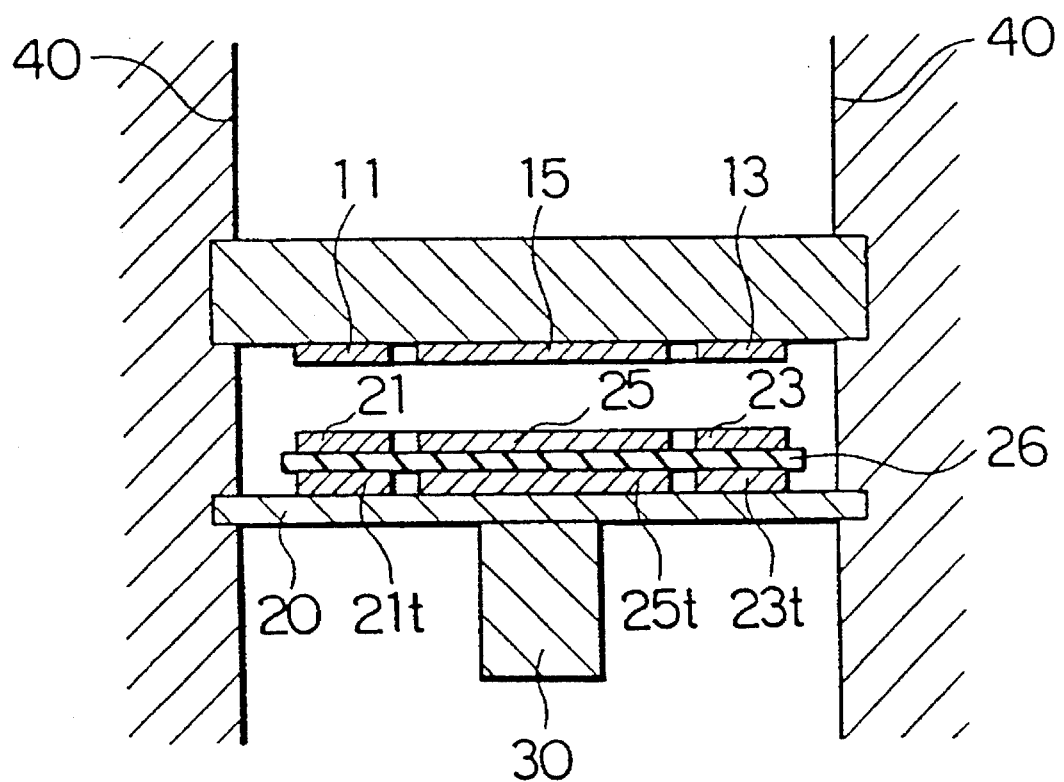

FIG. 10b is an embodiment in which five test electrodes 21t to 25t are formed on the flexible substarate 20. Between the test electrodes 21t to 25t and the displacement electrodes 21 to 25, an insulating layer 26 is formed. In this case, the electrode pairs for generating coulomb force are pairs of the test electrodes 21t to 25t and the fixed electrodes 11 to 15.

Figure 11:
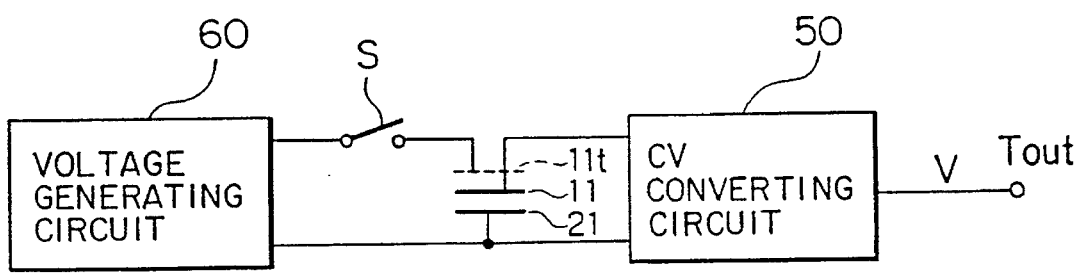
FIG. 11 is a circuit diagram showing a circuit for operating the detector shown in FIG. 10a and a circuit for implementing an operation test thereto.

FIG. 11 is an example of a circuit diagram in which this invention is applied to a detector of a structure as shown in FIG. 10a. A voltage generating circuit 60 applies a voltage across the test electrode 11t and the displacement electrode 21 by allowing the test switch S to be turned ON to exert coulomb force therebetween. Thus, the flexible substarte 20 produces bending, resulting in the equivalent state where an external force is exerted. On the other hand, the CV converting circuit 50 detects an electrostatic capacitance of the capacitance element C1 comprised of the fixed electrode 11 and the displacement electrode 21 to output it as a voltage V. Since the fixed electrode 11 and the test electrode 11t are electrically insulated by the insulating layer 16, the CV converting circuit 50 can carry out detection of the electrostatic capacitance without being affected by any means by an applied voltage produced by the voltage generating circuit 60. As the external connection terminal of this detector, it is sufficient to provide a common terminal conducting to respective displacement electrodes 21 to 25, detection terminals conducting to respective fixed electrodes 11 to 15, test terminals conducting to respective test terminals 11t to 15t. By confirmining whether or not a predetermined output is provided on the detection terminal when a predetermined voltage is applied to the test terminal, it is possible to easily carry out self diagnosis.

Figure 12:
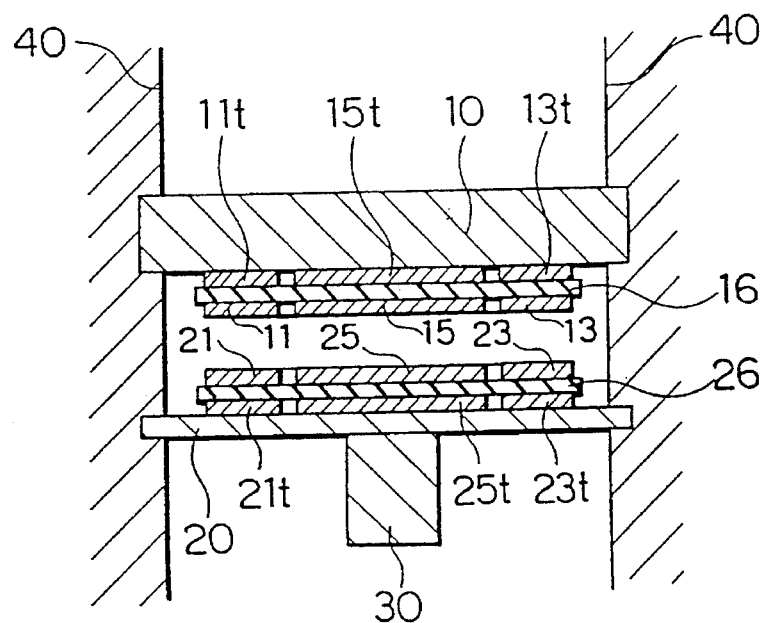
FIG. 12 is a side cross sectional view of another acceleration detector of the electrostatic capacitance type in which the method of testing the operation according to this invention is carried out to thereby provide a function to carry out a self diagnosis.

FIG. 12 shows an embodiment in which electrodes on the flexible substrate 20 side are separately provided without being commonly used. Namely, first test electrodes 21t to 25t are formed on the upper surface of the flexible substrate 20, and displacement electrodes 21 to 25 are formed through an insulating layer 26 thereon. Further, the fixed substrate 10 side is similar to that in the previously described embodiment, i.e., fixed electrodes 11 to 15 are formed through an insulating layer 16 on second test electrodes 11t to 15t. In such a structure, the electrode pairs for constituting capacitance elements C1 to C5 are pairs of fixed electrodes 11 to 15 and displacement electrodes 21 to 25, but the electrode pairs for generating coulomb force are pairs of the first test electrodes 21t to 25t and the second test electrodes 11t to 15t. The both electrode pairs completely separated from each other are used as the electrode pair.

Figure 13:
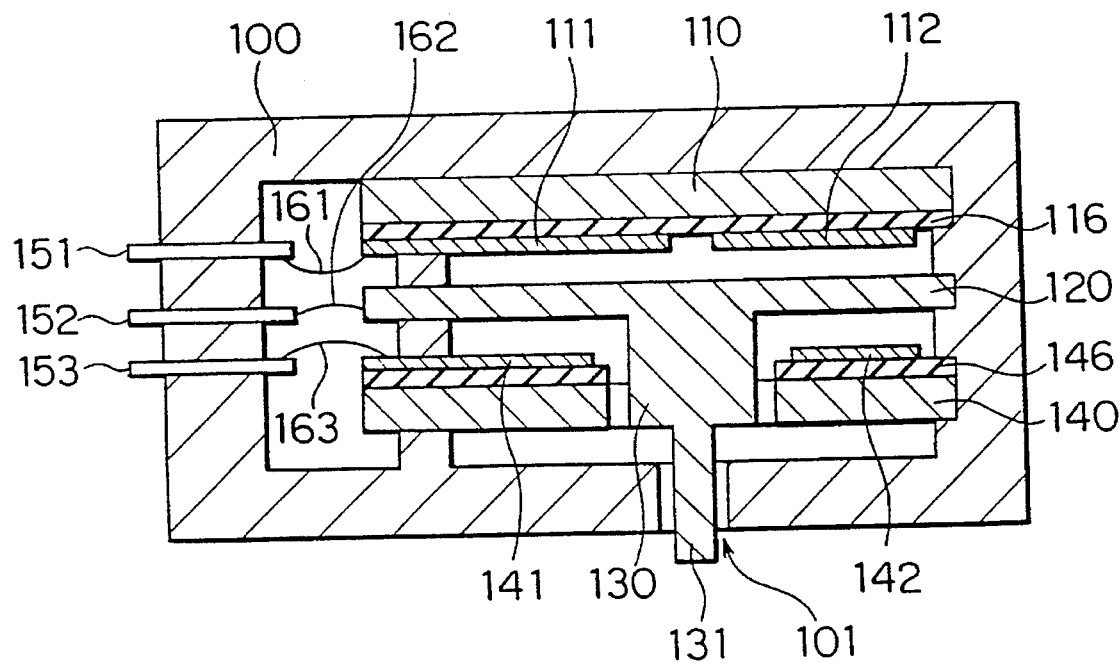
FIG. 13 is a side cross sectional view of a force detector of the electrostatic capacitance type in which the method of testing operation according to this invention is carried out to thereby provide a function to carry out a self diagnosis.

FIG. 13 is a side cross sectional view of a force detector according to a further embodiment. Within a detector casing 100, a fixed substrate 110, a flexible substrate 120, a working body 130, and an auxiliary substarate 140 are provided. A detection piece 131 extending from the working body 130 is protruding through a hole portion 101 provided in the detector casing 100 to the outside. In this embodiment, the above described respective components are all comprised of metal. An insulating layer 116 is formed on the lower surface of the fixed substrate 110, and two fixed electrodes 111 and 112 are further formed thereon. Further, an insulating layer 146 is formed on the upper surface of the auxiliary substarte 140, and two test electrodes 141 and 142 are further formed thereon. At the outside on the left side of the detector casing 100, a detection terminal 151, a common terminal 152, and a test terminal 153 are conducted out (although respective single terminals are only illustrated in the figure, terminals corresponding to the number of electrodes are actually prepared). As a matter of courcre, respective terminals 151 to 153 are electrically insulated from the detector casing 100. Further, the respective terminals 151 to 153 are connected to the respective electrodes and the flexible substrate 120 by means of bonding wires 161 to 163. In this detector, although no displacement electrode is provided on the flexible substrate 120, since the flexible substrate 120 is comprised of metal as previously described, the flexible substrate itself has a function of the electrode.

In this detector, when a force is applied to the front end of the detection piece 131, the flexible substrate 120 produces bending. As a result, the distance between the flexible substrate 120 (functioning as a displacement electrode) and the fixed electrodes 111 and 112 varies. Accordingly, it is possible to detect a force exerted on the basis of changes in the electrostatic capacitance between the detection terminal 151 and the common terminal 152. However, since two fixed electrodes .are only provided in the detector of this embodiment, it is only possible to carry out detection of force components in a two dimensional direction (force components in left and right directions and in upper and lower directions). In order to detect force components in a three-dimensional direction, it is enough to provide four fixed electrodes at the minimum. Now, in order to carry out the operation test of this detector, it is sufficient to carry out the previously described detection processing in the state where a predetermined voltage is applied across the test terminal 153 and the common terminal 152. By action of coulomb force based on an applied voltage, it is possible to create the same state as the state where an external force is exerted on the detection piece 131. It is to be noted that it is sufficient to similarly provide four test electrodes at the minimum in order to carry out the operataion in a three-dimensional direction.

Figure 14:
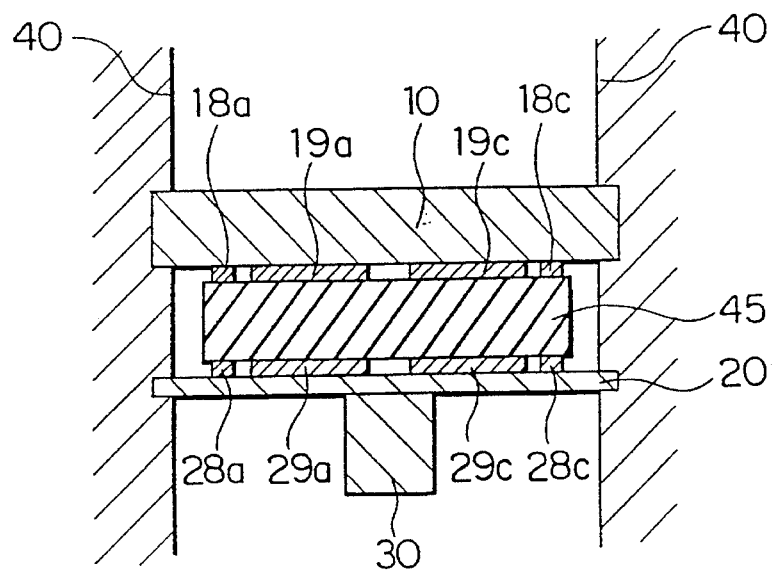
FIG. 14 is a side cross sectional view of an acceleration detector of the piezo electric type in which the method of testing operation according to this invention is carried out to thereby provide a function to carry out a self diagnosis.
Figure 15:
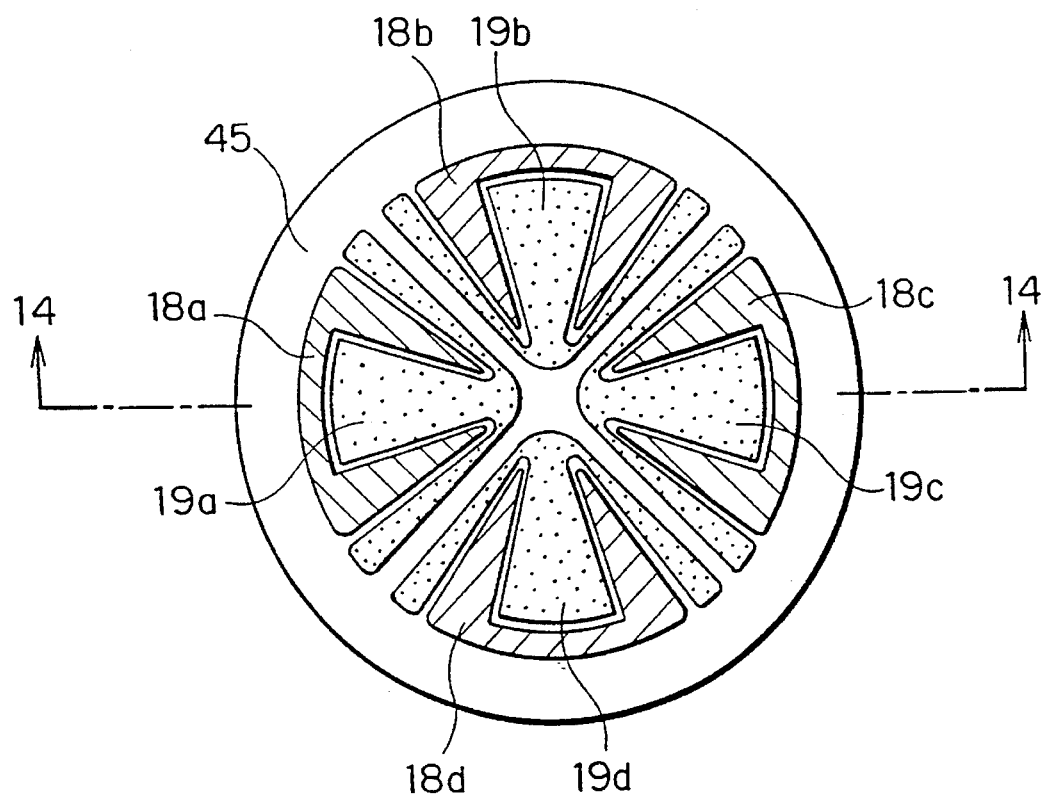
FIG. 15 is a top view showing the shape of electrodes formed on the upper surface of the piezo electric element 45 in the detector shown in FIG. 14.

The several embodiments which have been described are all directed to detectors of the electrostatic capacitance type. This invention can be applied not only to such detectors of the electrostatic capacitance type, but also to detectors of the piezo electric type. FIG. 14 is a side cross sectional view of an acceleration detector of the piezo electric type having an operation test function according to this invention. In the same manner as in the detector of the electrostatic capacitance type shown in FIG. 1, a fixed substrate 10 having rigidity and a flexible substrate 20 having flexibility are supported by a detector casing 40, and a working body 30 is connected on the lower surface of the flexible substrate 20. On the lower surface of the fixed substrate 10 and the upper surface of the flexible substrate 20, eight electrodes are formed as described later, respectively. Between these electrodes, a piezo electric element 45 is put. As the piezo electric element 45, for example, PZT ceramics (solid solution of lead titanate and lead zirconate) may be used. It is sufficient to insert such ceramics between both electrodes. In actual terms, it is preferable to manufacture a detector by using a method of firstly forming electrodes on the both upper and lower surfaces of the piezo electric element 45 and secondly inserting them between both substrates. At this time, such electrodes should be inserted between the substrates in the state where a predetermined pressure is applied in upper and lower directions of the figure by the substrates. When such a bias pressure is applied, detection can be made not only in the case where the interval between upper and lower electrodes is contracted, but also in the case where that interval is broadened. FIG. 15 is a top view of the piezo electric element 45. In this figure, the planar arrangement of eight electrodes formed on the upper surface is clearly illustrated. As shown, the electrode formed on the upper surface of the piezo electric element 45 is comprised of four fixed electrodes 18a to 18d (there is employed in the figure indication of hatching by slanting lines implemented for helping visual grasp of the pattern), and four test electrodes 19a to 19d (there is similarly employed indication of hatching by dot implemented). Also on the lower surface of the piezo electric element 45, four displacement electrodes 28a to 28d and four test electrodes 29a to 29d are formed at exactly the same arrangement as the above. The cross section cut along the cutting plane lines 14—14 of the piezo electric element 45 of FIG. 15 is shown in FIG. 14. It is to be noted that the electrode configuration is not limited to a planar single layer structure as shown in FIG. 15, but may be of a multi layer stucked structure as shown in FIGS. 10a, 10b and 12.

In such a detector of the piezo electric type, a change of the distance between opposite electrode pair is detected as a voltage produced across both the electrodes in place of detecting it as a change of the electrostatic capacitance. Namely, when an acceleration is exerted on the working body 30, so bending is produced in the flexible substrate 20, a partial compressive force or expansive force is applied to the piezo electric element 45. Thus, voltages are produced in the respective electrode pairs. By recognizing the degree of voltages outputted to the respective electrode pairs, it is possible to detect the direction and the magnitude in a three-dimensional coordinate of an exerted acceleration. In the detector of the piezo electric type, electrode pairs for detection and electrode pairs for test cannot be commonly used as in the case of the detector of the electrostatic capacitance type. This is because since an approach is employed to directly detect a voltage produced across the both electrodes, a voltage for test cannot be applied to the same electrode. For this reason, the electrode pairs for detection and the electrode pairs for test have to be separately provided. If the electrode arrangement shown in FIG. 15 is implemented, it is possible to mix two kinds of electrodes on the same plane, and to carry out detection in a three-dimensional direction and the operation test thereof.

The operation test can be carried out as follows. For example, when an approach is employed to apply voltages across the test electrodes 19a and 29a and across the test electrodes 19c and 29c, thus to allow an attractive force to be exerted between the test electrodes 19a and 29a, and to allow a repulsive force to be exerted between the test electrodes 19c and 29c, if this detector normally operates, predetermined voltages are produced across the fixed electrode 18a and the displacement electrode 28a and across the fixed electrode 18c and the displacement electrode 28c. By monitoring these voltages, it is possible to carry out the operation test. By applying a voltage across the test electrodes 19b and 29b and across the test electrodes 19d and 29d, a test relating to the direction vertical to the previously described test direction can be carried out.

Figure 16:
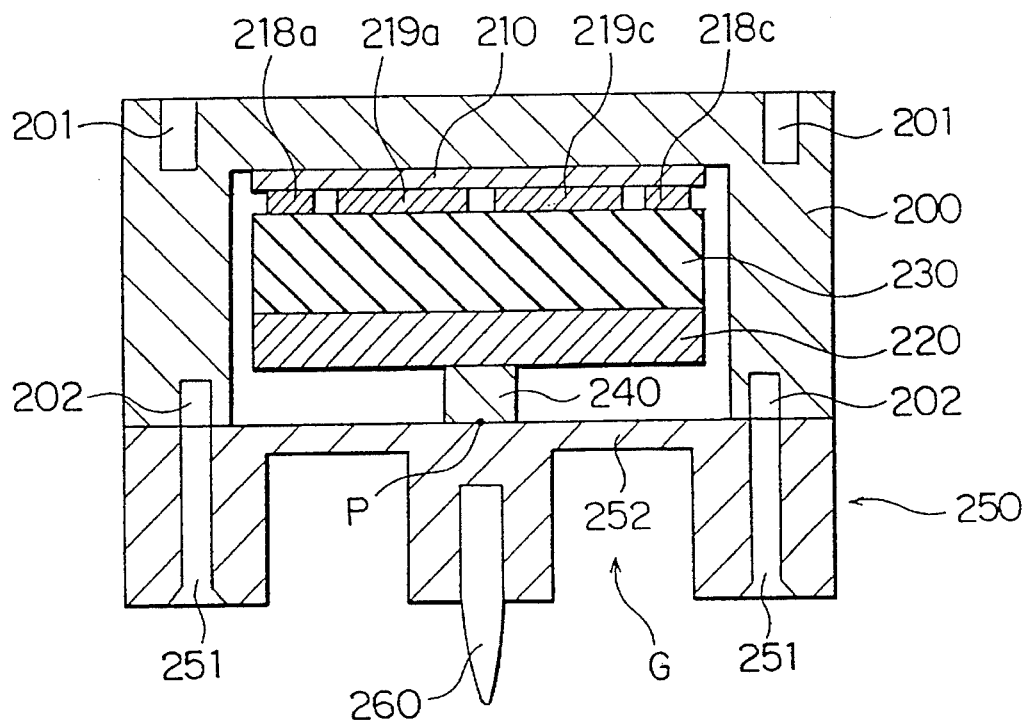
FIG. 16 is a side cross sectional view of a force detector of the piezo electric type in which the method of testing operation according to this invention is carried out to thereby provide a function to carry out a self diagnosis.

FIG. 16 is a side cross sectional view of a force detector of the piezo electric type having an operation test function according to this invention. A detector casing 200 is fixed to an industrial machine, etc. by using screw holes 201, and a strain generative body 250 is connected to the lower part thereof. The strain generative body 250 is comprised of metal, and a doughnut groove G is formed at the lower surface thereof. The portion 252 where this groove G is formed is thin in thickness thus to have flexibility. The screws passed through holes 251 of the strain generative body 250 are screw fixed into the screw holes 202 of the detector casing 200. A detection piece 260 extends from the lower surface at the central portion of the strain generative body 250, and an external force exerted on the front end thereof is transmitted as a moment force relating to the working point P. Electrodes are formed on the upper surface and the lower surface of a piezo electric element 230 serving as the center of this detector, and are in the state where it is put or held by the fixed substrate 210 and the displacement electrode flat plate 220 with a predetermined pressure. On the upper surface thereof, four fixed electrodes 218a to 218d and four test electrodes 219a to 219d are formed at the same arrangement as the pattern shown in FIG. 15. On the other hand, a single displacement electrode flat plate 220 is formed on the lower surface. The eight electrodes on the upper surface are fixed on the detector casing by the fixed substrate 210, and the displacement electrode flat plate 220 on the lower surface is connected to the central portion on the upper surface of the strain generative body 250 by means of a transmission body 240. By constituting the displacement electrode flat plate 220 with a thick metal plate having rigidity, it is possible to efficiently transmit a force exerted on the working point P to the piezo electric element 230.

In the force detector of the piezo electric type thus constructed, the displacement electrode flat plate 220 is used as a common electrode, thus making it possible to carry out detection of an external force exerted on the detection piece 260 by voltages produced on the fixed electrodes 218a to 218d. In addition, by monitoring voltages produced on the fixed electrodes 218a to 218d while applying predetermined voltages to the test electrodes 219a to 219d, it is possible to carry out the operation test.

Figure 17:
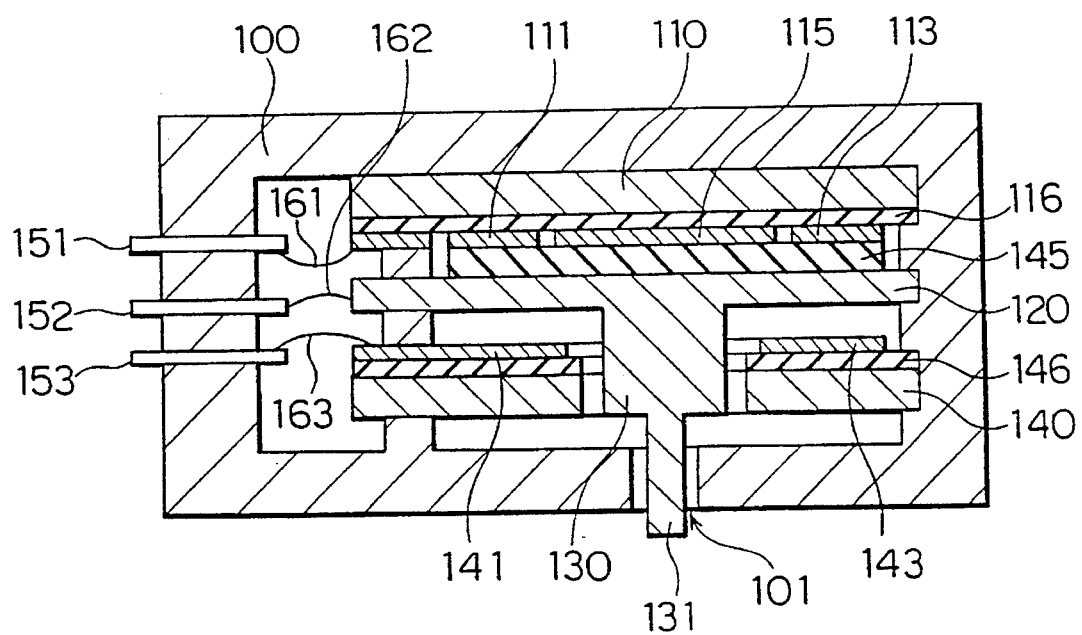
FIG. 17 is a side cross sectional view of another force detector of the piezo electric type in which the method of testing the operation according to this invention is carried out to thereby provide a function to carry out a self diagnosis.

In the embodiment shown in FIG. 17, the force detector of the electrostatic capacitance type shown in FIG. 13 is replaced by a force detector of the piezo electric type. In this detector, five fixed electrodes 111 to 115 are formed at the same arrangement as the planar arrangement shown in FIG. 2, thus making it possible to carry out detection of a force in a three-dimensional direction. Further, four test electrodes 141 to 144 are arranged (indication that the electrode 142 is arranged backward of the working body 130 and the electrode 144 is arranged forward of the working body 130 is omitted), thus making it possible to carry out the operation test in a three-dimensional direction. Between the fixed electrodes 111 to 115 and the flexible substrate 120, a piezo electric element 145 is inserted. By voltages produced on the fixed electrodes 111 to 115, detection of an external force exerted is carried out.

It is to be noted that the embodiments shown in FIGS. 10a, 10b, 12, 13, 14, 16 and 17 are an embodiment provided with electrodes necessary at the minimum for implementing the operation test method according to this invention of the fixed electrode, the displacement electrode and the test electrode. In the case where an attractive force based on coulomb force is exerted between two electrodes, it is sufficient to provide two electrodes as shown in FIG. 8. However, in the case where a repulsive force is exerted, an auxiliary electrode is further required as shown in FIG. 9. Accordingly, it is preferable from a view point of practical use to further provide an auxiliary electrode in the structures shown in the above described respective embodiments.

§4 Embodiment constructed to take a difference in a Z-axis direction

As illustrated in the circuit diagram shown in FIG. 6, the basic acceleration detector shown in FIG. 1 takes a difference for detection of acceleration components in an X-axis and a Y-axis directions, but does not take a difference for detection of an acceleration component in a Z-axis direction. Since detection based on difference advantageously cancels an error due to the external environment such as temperature, etc., it is preferable to take a difference for detection of an acceleration in a Z-axis direction as well. An embodiment for realizing this is shown below.

Figure 18:
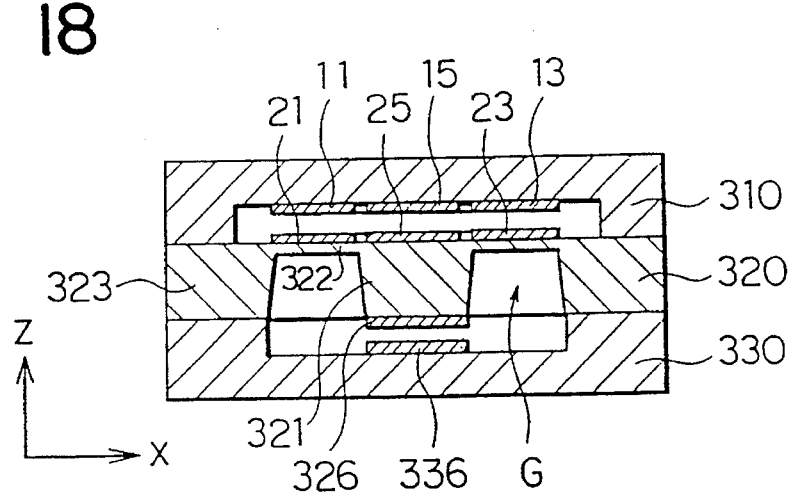
FIG. 18 is a side cross sectional view of an acceleration detector of the type to take differences in detection of acceleration components in all directions.
Figure 19A:
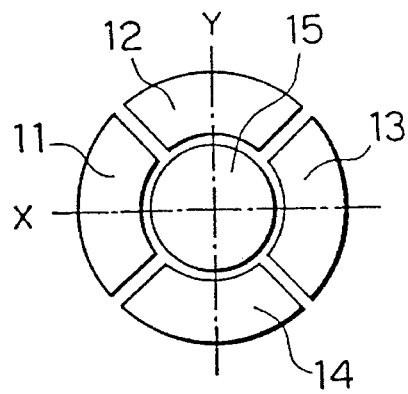
FIGS. 19a and 19b are plane views showing an electrode arrangement in the detector shown in FIG. 18.
Figure 19B:
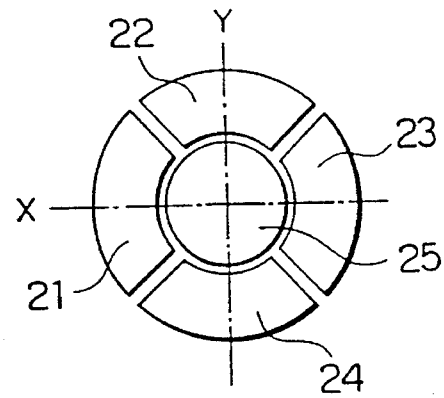

The embodiment showing the side cross section in FIG. 18 is an acceleration detector for carrying out detection of acceleration components in all X, Y and Z directions by taking differences. On the lower surface of the fixed substrate 310, five fixed electrodes 11 to 15 are formed in accordance with the layout shown in FIG. 19a. In a flexible substrate 320, a doughnut groove G is dug at the lower surface thereof, a working portion 321 is formed at the central portion thereof, a flexible portion 322 is formed therearound, and a fixed portion 323 is formed therearound. On the upper surface thereof, five displacement electrodes 21 to 25 are formed in accordance with the layout shown in FIG. 19b. The above mentioned configuration is the same as the basic configuration shown in FIG. 1. This detector is characterized in that a second fixed substrate 330 is further provided, and that a displacement electrode 326 and a fixed electrode 336 are respectively formed on the lower of the working portion 321 and the upper surface of the second fixed substrate 330 in a manner that they are opposite to each other.

Detection of an acceleration components with respect to the X-axis and the Y-axis directions by this detector and the operation test thereof are the same as those of the detector of FIG. 1. However, detection of an acceleration with respect to the Z-axis direction and the operation test thereof are carried out by the circuit shown in FIG. 20. Here, a capacitance element C5 is comprised of a fixed electrode 15 and a displacement electrode 25, and a capacitance element C6 is comprised of a fixed electrode 336 and a displacement electrode 326. When compared with the circuit with respect to the Z-axis direction shown in FIG. 6, this circuit differs from the former in that a voltage generating circuit 66 and a CV converting circuit 56 with respect to the capacitance element C6 are added, and that a difference between voltage values V5 and V6 is determined by a differential amplifier 73 to output it as a detected value with respect to the Z-axis direction. Thus, detected values with respect to X,Y and Z-axis directions are determined on the basis of differences, thus making it possible to cancel the influence of temperature, etc.

Figure 20:
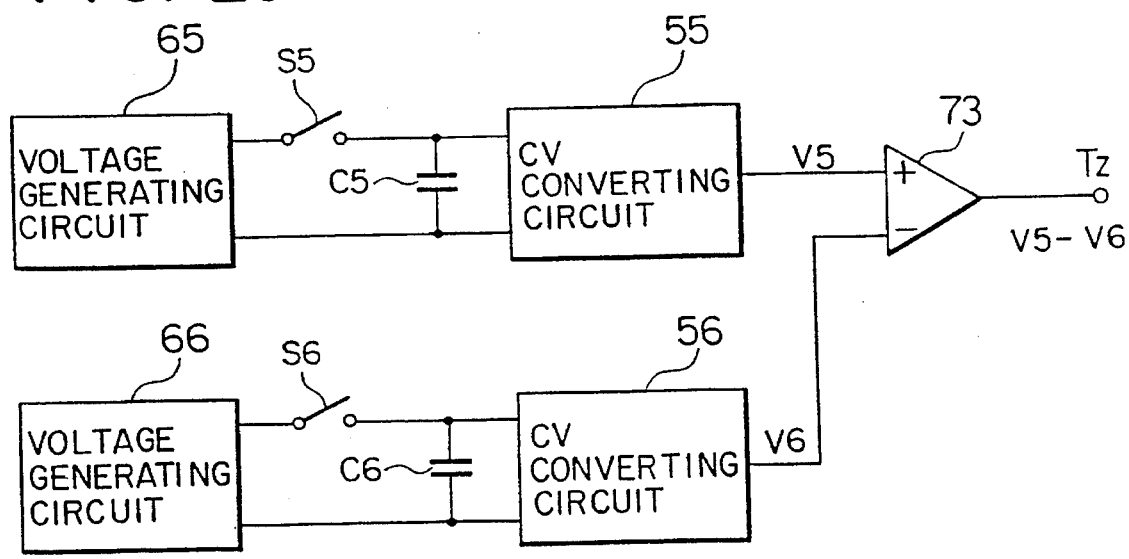
FIG. 20 is a circuit diagram of a circuit for carrying out detection of an acceleration in a Z-axis direction in the detector shown in FIG. 18 and for carrying out the operation test thereof.
Figure 21:
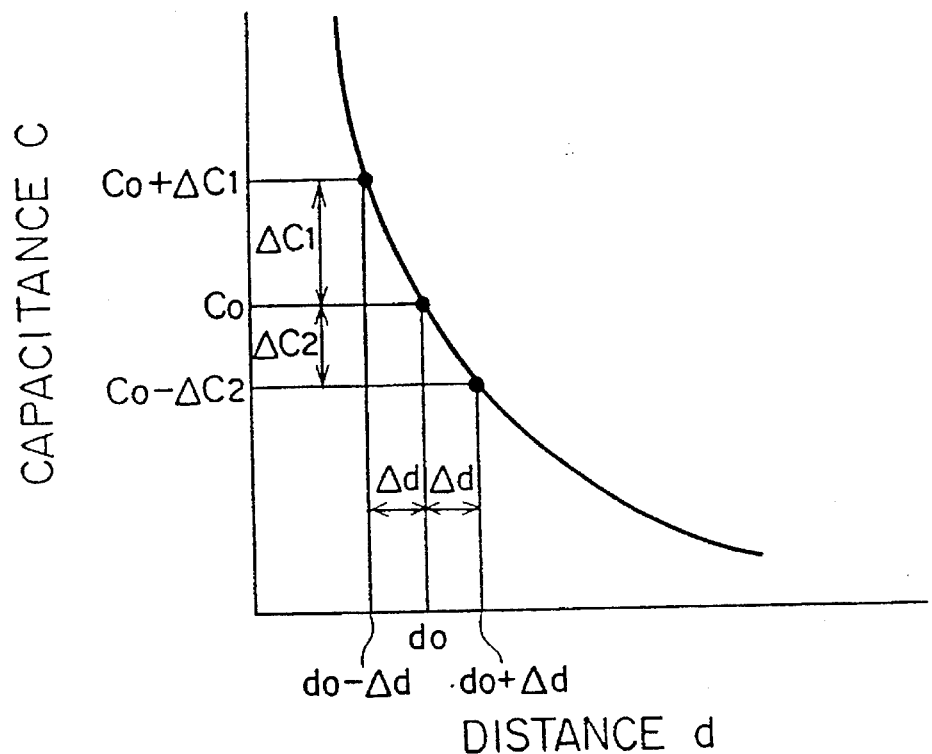
FIG. 21 is a graph showing the general relationship between the distance d between electrodes of the capacitance element and the capacitance value C.

Further, such a detection based on difference is advantageous also in the following points. The relationship between distance d between electrodes and the capacitance value C of the capacitance element is generally as in the graph shown in FIG. 21. When the distance is contracted by $\Delta d$ from the state where the capacitance value indicates C0 at the distance d0 so that d0–$\Delta d$ results, the capacitance value is increased by $\Delta C1$, resulting in C0+$\Delta C1$. In contrast, when the distance is widened by $\Delta d$ so that d0+$\Delta d$ results, the capacitance value is decreased by $\Delta C2$, resulting in C0–$\Delta C2$. Here, $\Delta C1 > \Delta C2$. Accordingly, when detection of an acceleration component in a Z-axis direction is made on the basis of only the capacitance value of a set of capacitance elements C5, even in the case of acceleration components of the same absolute, the degree of changes in the capacitance value in a positive Z-axis direction and that in a negative Z-axis direction differ from each other. To cope with this, it is required to provide any correction circuit. However, when detection based on difference is carried out as shown in FIG. 20, such a problem does not arise. For example, in the detector shown in FIG. 18, when an acceleration is exerted in a positive Z-axis direction (in an upper direction in the figure), the capacitance value of the capacitance element C5 changes from C0 to C0+$\Delta C1$, and the capacitance value of the capacitance element C6 changes from C0 to C0–$\Delta C2$. Thus, an output from the differential amplifier 73 becomes equal to a value corresponding to $\Delta C1+\Delta C2$. On the contrary, when the same acceleration is exerted in a negative Z-axis direction (in a lower direction in the figure), the capacitance value of the capacitance element C5 changes from C0 to C0–$\Delta C2$, and the capacitance value of the capacitance element C6 changes from C0 to C0+$\Delta C1$. Thus, an output from the differential amplifier 73 becomes equal to a value corresponding to $-(\Delta C1+\Delta C2)$. In this way, an output of the same absolute is provided with respect acceleration components of the same absolute.

Figure 22:
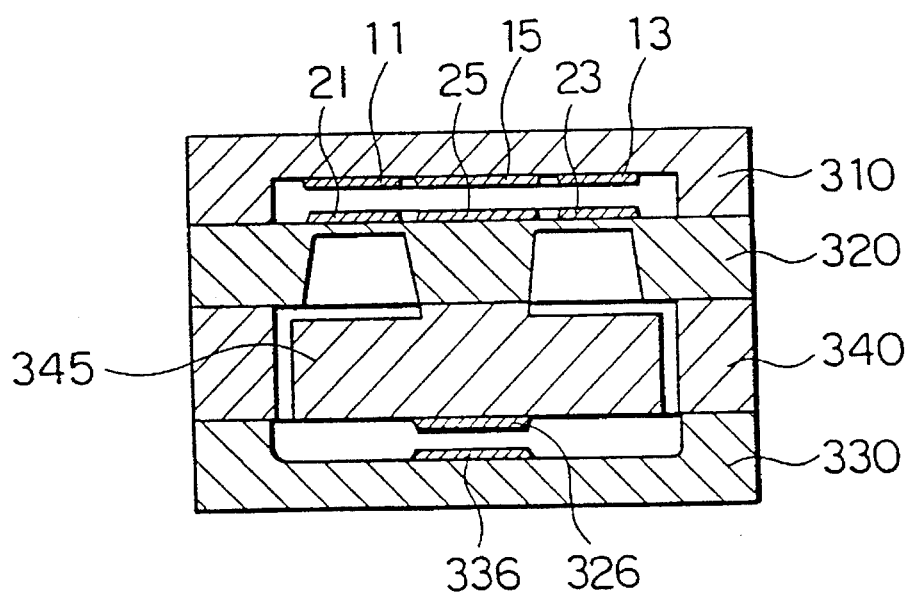
FIG. 22 is a side cross sectional view showing another embodiment of the detector shown in FIG. 18.

The embodiment shown in FIG. 22 is characterized in that a working body 345 and a pedestal 340 are further added to the embodiment shown in FIG. 18. A displacement electrode 326 is formed on the lower surface of the working body 345. In addition, the embodiment shown in FIG. 23 is characterized in that the position of the electrode of the embodiment shown in FIG. 22 is varied: respective fixed electrodes 11 to 15 are formed on the fixed substrate 330, respective displacement electrodes 21 to 25 are formed on the lower surface of working body 345; a fixed electrode 336 is formed on the lower surface of fixed substrate 310; and a displacement electrode 326 is formed on the upper surface of flexible substrate 320.

Figure 23:
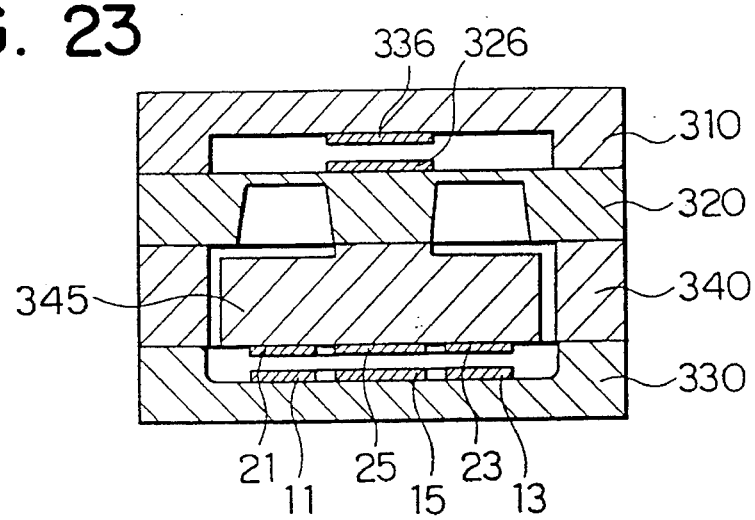
FIG. 23 is a side cross sectional view showing a further embodiment of the detector shown in FIG. 18.
Figure 24:
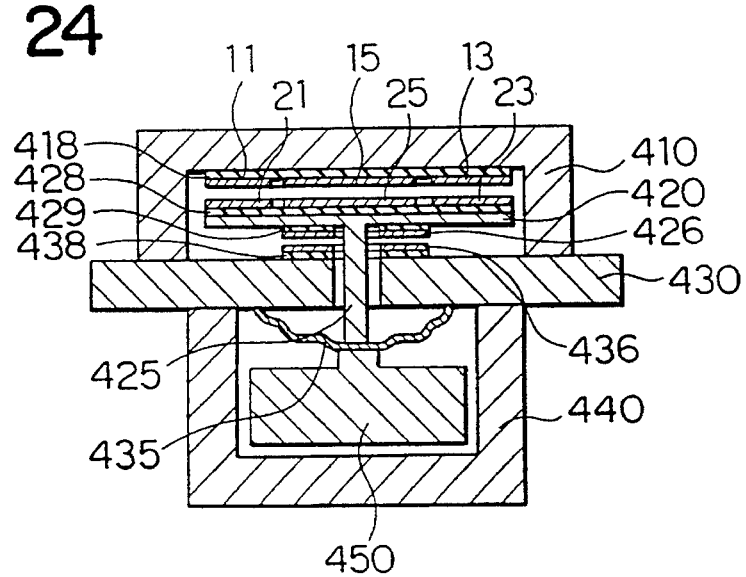
FIG. 24 is a side cross sectional view showing an embodiment in which the detector shown in FIG. 18 is constituted with metal.

The above described respective embodiments of FIGS. 18, 22 and 23 are suitable for constituting respective substrates with glass or semiconductor (an insulating layer is formed between the substrate and the electrode in this case). On the other hand, the acceleration detector shown in FIG. 24 is directed to the example suitable for constituting the substrate with metal. In this embodiment, members 410, 420, 425, 430, 440 and 450 are all comprised of metal. On the lower surface of the member 410, five fixed electrodes 11 to 15 are formed through an insulating layer 418. Further, five displacement electrodes 21 to 25 are formed through an insulating layer 428 on the upper surface of the member 420, and a doughnut shaded displacement electrode 426 is formed through an insulating layer 429 on the lower surface of the member 420. A member 425 is connected on the lower surface of the member 420, and the lower end of the member 425 is connected to a member 450 through a diaphragm 435. Further, a doughnut shaped fixed electrode 436 is formed through an insulating layer 438 on the upper surface of the member 430. When an acceleration is exerted on the member 450, the diaphragm 435 is bent, so the member 420 is subjected to displacement through the member 425. The principle of detection of displacement is as described above.

Figure 25:
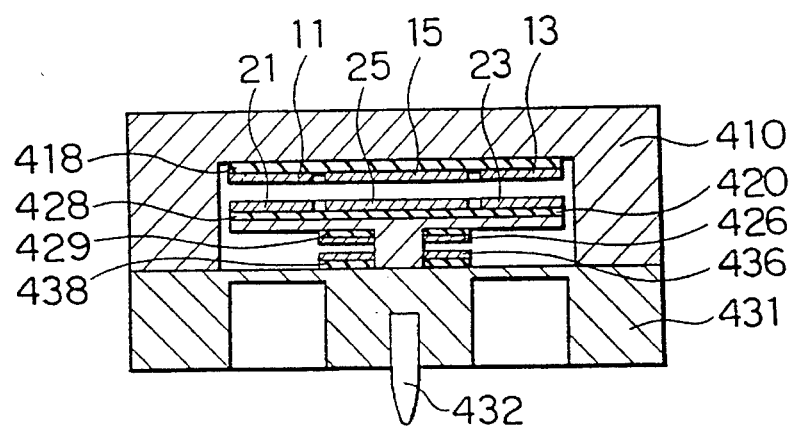
FIG. 25 is a side cross sectional view showing an embodiment in which the detector shown in FIG. 24 is applied to a force detector.

In the embodiment shown in FIG. 25, the acceleration detector shown in FIG. 24 is applied to a force detector wherein the configuration of the lower half is replaced by a metal member 431 (flexible substrate). The member 420 is subjected to displacement on the basis of an external force exerted on the front end of the detection piece 432. Thus, detection of this external force is carried out.

§5 Other embodiments

While this invention has been described in connection with the several embodiments shown, this invention is not limited to such embodiments, but may be carried out in various forms in addition thereto. For example, as the arrangement of respective electrodes, various arrangements may be taken in addition to the above described embodiments. Further, the numbers of respective electrodes are not limited only to those in the above described embodiments. How many number of fixed electrodes, displacement electrodes and test electrodes are formed and/or where they are formed are the matter suitably changeable in design. Further, while, in the above described embodiment, there was disclosed the example where the arrangement of eight electrodes shown in FIG. 15 is applied to a detector of the piezo electric type, it is a matter of course that this arrangement can be applied to a detector of the electrostatic capacitance type. As compared to an employment of the structure in which two electrode layers are stacked as in the detector shown in FIG. 10a, 10b or 12, the arrangement of a single electrode layer as shown in FIG. 15 becomes simple in the manufacturing process. This arrangement is rather preferable in the mass production.

While, in the above described embodiments, the method of forming a metal layer such as aluminum on a semiconductor substrate to use it as an electrode is mainly disclosed as an example, such an electrode may be formed by using any method. For example, there may be employed a method of forming an impurity diffused region in a semiconductor substrate to use it as an electrode. Further, if the fixed substrate or the flexible substrate is formed with metal, this substrate itself may be used as an electrode. Accordingly, in this invention, it is not necessarily required that the electrode is separate from the substrate. In addition, while, in the above described embodiments, the acceleration detectors and the force detectors have been described, if the working body is constituted with a magnetic material, it is possible to carry out detection of a force based on magnetism. Namely, this invention is similarly applicable to detectors for magnetism.

INDUSTRIAL APPLICABILITY

A method of testing the operation according to this invention is widely applicable to force detectors, acceleration detectors or magnetic detectors for detecting a physical quantity by making use of changes in distance between electrodes. Further, detectors having a function to carry out this operation test can carry out the operation test by a simple method, and can be therefore utilized with high reliability in practical use. Accordingly, it can be expected that this invention is applied to automotive vehicles or industrial robots.

I claim:

1. An acceleration sensor to detect a first component of acceleration along an X-axis and a second component of acceleration along a Y-axis in an XYZ three-dimensional coordinate system, the sensor comprising:

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face to said flexible substrate with a predetermined distance and fixed to said sensor casing;

a working body attached to said working portion to transmit a force produced by an acceleration to said working portion so that said flexible substrate produces mechanical deformation;

four capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the four displacement electrodes and the four fixed electrodes being insulated from each other so that said four capacitance elements are electrically independent from each other, wherein a first capacitance element is located in a positive sector of the X-axis, a second capacitance element is located in a negative sector of the X-axis, a third capacitance element is located in a positive sector of the Y-axis and a fourth capacitance element is located in a negative sector of the Y-axis;

four test electrodes fixed to said fixed substrate on a third plane parallel with the XY-plane, said test electrodes being isolated from each other and from the fixed electrodes, and each of said four test electrodes facing each of the four displacement electrodes;

detection means for detecting the first component of acceleration along the X-axis based on a change of an electrostatic capacitance in the first capacitance element and the second capacitance element and for detecting the second component of acceleration along the Y-axis based on a change of an electrostatic capacitance in the third capacitance element and the fourth capacitance element; and voltage application means for applying a predetermined voltage across a test electrode and a displacement electrode facing thereto for moving the displacement electrode by a coulomb force so that the flexible substrate produces mechanical deformation.

2. An acceleration sensor to detect a first component of acceleration along an X-axis, a second component of acceleration along a Y-axis, and a third component of acceleration along a Z-axis in an XYZ three-dimensional coordinate system, the sensor comprising:

a sensor casing;

a flexible substrate arranged parallel with an XY-plane of said, coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

five capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the five displacement electrodes and the five fixed electrodes being insulated from each other so that said five capacitance elements are electrically independent from each other, wherein a first capacitance element is located in a positive sector of the X-axis, a second capacitance element is located in a negative sector of the X-axis, a third capacitance element is located in a positive sector of the Y-axis, a fourth capacitance element is located in a negative sector of the Y-axis, and a fifth capacitance element is located so as to cross the Z-axis;

five test electrodes fixed to said fixed substrate on a third plane parallel with the XY-plane, said test electrodes being isolated from each other and from the fixed electrodes, and each of said five test electrodes facing each of the five displacement electrodes;

detection means for detecting the first component of acceleration along the X-axis based on a change of an electrostatic capacitance in the first capacitance element and the second capacitance element, for detecting the second component of acceleration along the Y-axis based on a change of an electrostatic capacitance in the third capacitance element and the fourth capacitance element, and for detecting the third component of acceleration along the Z-axis based on a change of an electrostatic capacitance in the fifth capacitance element; and voltage application means for applying a predetermined voltage across a test electrode and a displacement electrode facing thereto for moving the displacement electrode by a coulomb force so that the flexible substrate produces mechanical deformation.

3. An acceleration sensor to detect a first component of acceleration along an X-axis and a second component of acceleration along a Y-axis in an XYZ three-dimensional coordinate system, the sensor comprising:

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face to said flexible substrate with a predetermined distance and fixed to said sensor casing;

a working body attached to said working portion to transmit a force produced by an acceleration to said working portion so that said flexible substrate produces mechanical deformation;

four capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, respective electrodes of at least one of the four displacement electrodes and the four fixed electrodes being insulated from each other so that said four capacitance elements are electrically independent from each other, wherein a first capacitance element is located in a positive sector of the X-axis, a second capacitance element is located in a negative sector of the X-axis, a third capacitance element is located in a positive sector of the Y-axis and a fourth capacitance element is located in a negative sector of the Y-axis;

four test electrodes fixed to said flexible substrate on a third plane parallel with the XY-plane, said test electrodes being isolated from each other and from the displacement electrodes, and each of said four test electrodes facing each of the four fixed electrodes;

detection means for detecting the first component of acceleration along the X-axis based on a change of an electrostatic capacitance in the first capacitance element and the second capacitance element and for detecting the second component of acceleration along the Y-axis based on a change of an electrostatic capacitance in the third capacitance element and the fourth capacitance element; and voltage application means for applying a predetermined voltage across a test electrode and a fixed electrode facing thereto for moving the test electrode by a coulomb force so that the flexible substrate produces mechanical deformation.

4. An acceleration sensor to detect a first component of acceleration along an X-axis, a second component of acceleration along a Y-axis, and a third component of acceleration along a Z-axis in an XYZ three-dimensional coordinate system, the sensor comprising:

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face to said flexible substrate with a predetermined distance and fixed to said sensor casing;

a working body attached to said working portion to transmit a force produced by an acceleration to said working portion so that said flexible substrate produces mechanical de formation;

five capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the five displacement electrodes and the five fixed electrodes being insulated from each other so that said five capacitance elements are electrically independent from each other, wherein a first capacitance element is located in a positive sector of the X-axis, a second capacitance element is located in a negative sector of the X-axis, a third capacitance element is located in a positive sector of the Y-axis, a fourth capacitance element is located in a negative sector of the Y-axis, and a fifth capacitance element is located so as to cross the Z-axis;

five test electrodes fixed to said flexible substrate on a third plane parallel with the XY-plane, said test electrodes being isolated from each other and from the displacement electrodes, and each of said five test electrodes facing each of the five fixed electrodes;

detection means for detecting the first component of acceleration along the X-axis based on a change of an electrostatic capacitance in the first capacitance element and the second capacitance element, for detecting the second component of acceleration along the Y-axis based on a change of an electrostatic capacitance in the third capacitance element and the fourth capacitance element, and for detecting the third component of acceleration along the Z-axis based on a change of an electrostatic capacitance in the fifth capacitance element; and voltage application means for applying a predetermined voltage across a test electrode and a fixed electrode facing thereto for moving the test electrode by a coulomb force so that the flexible substrate produces mechanical deformation.

5. An acceleration sensor to detect a first component of acceleration along an X-axis and a second component of acceleration along a Y-axis in an XYZ three-dimensional coordinate system, the sensor comprising:

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face to said flexible substrate with a predetermined distance and fixed to said sensor casing;

a working body attached to said working portion to transmit a force produced by an acceleration to said working portion so that said flexible substrate produces mechanical deformation;

four capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the four displacement electrodes and the four fixed electrodes being insulated from each other so that said four capacitance elements are electrically independent from each other, wherein a first capacitance element is located in a positive sector of the X-axis, a second capacitance element is located in a negative sector of the X-axis, a third capacitance element is located in a positive sector of the Y-axis and a fourth capacitance element is located in a negative sector of the Y-axis;

four fixed test electrodes fixed to said fixed substrate on a third plane parallel with the XY-plane, said fixed test electrodes being isolated from each other and from the fixed electrodes, wherein a first fixed test electrode is located in a positive sector of the X-axis, a second fixed test electrode is located in a negative sector of the X-axis, a third fixed test electrode is located in a positive sector of the Y-axis, and a fourth fixed test electrode is located in a negative sector of the Y-axis;

four displacement test electrodes fixed to said flexible substrate on a fourth plane parallel with the XY-plane, said displacement test electrodes being isolated from each other and from the displacement electrodes, and each of said displacement test electrodes facing each of the four fixed test electrodes;

detection means for detecting the first component of acceleration along the X-axis based on a change of an electrostatic capacitance in the first capacitance element and the second capacitance element and for detecting the second component of acceleration along the Y-axis based on a change of an electrostatic capacitance in the third capacitance element and the fourth capacitance element; and voltage application means for applying a predetermined voltage across a fixed test electrode and a displacement test electrode facing thereto for moving the displacement test electrode by a coulomb force so that the flexible substrate produces mechanical deformation.

6. An acceleration sensor to detect a first component of acceleration along an X-axis, a second component of acceleration along a Y-axis, and a third component of acceleration along a Z-axis in an XYZ three-dimensional coordinate system, the sensor comprising:

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

five capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the five displacement electrodes and the five fixed electrodes being insulated from each other so that said five capacitance elements are electrically independent from each other, wherein a first capacitance element is located in a positive sector of the X-axis, a second capacitance element is located in a negative sector of the X-axis, a third capacitance element is located in a positive sector of the Y-axis, a fourth capacitance element is located in a negative sector of the Y-axis, and a fifth capacitance element is located so as to cross the Z-axis;

five fixed test electrodes fixed to said fixed substrate on a third plane parallel with the XY-plane, said fixed test electrodes being isolated from each other and from the fixed electrodes, wherein a first fixed test electrode is located in a positive sector of the X-axis, a second fixed test electrode is located in a negative sector of the X-axis, a third fixed test electrode is located in a positive sector of the Y-axis, a fourth fixed test electrode is located in a negative sector of the Y-axis, and a fifth fixed test electrode is located so as to cross the Z-axis;

five displacement test electrodes fixed to said flexible substrate on a fourth plane parallel with the XY-plane, said displacement test electrodes being isolated from each other and from the displacement electrodes, and each of said displacement test electrodes facing each of the five fixed test electrodes;

detection means for detecting the first component of acceleration along the X-axis based on a change of an electrostatic capacitance in the first capacitance element and the second capacitance element, for detecting the second component of acceleration along the Y-axis based on a change of an electrostatic capacitance in the third capacitance element and the fourth capacitance element, and for detecting the third component of acceleration along the Z-axis based on a change of an electrostatic capacitance in the fifth capacitance element; and voltage application means for applying a predetermined voltage across a fixed test electrode, and a displacement test electrode facing thereto for moving the displacement test electrode by a coulomb force so that the flexible substrate produces mechanical deformation.

7. A method of testing an operation of an acceleration sensor to detect a first component of acceleration along an X-axis and a second component of acceleration along a Y-axis in an XYZ three-dimensional coordinate system, said method comprising:

providing a sensor having;

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

four capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the four displacement electrodes and the four fixed electrodes being insulated from each other so that said four capacitance elements are electrically independent from each other, wherein a first capacitance element is located in a positive sector of the X-axis, a second capacitance element is located in a negative sector of the X-axis, a third capacitance element is located in a positive sector of the Y-axis and a fourth capacitance element is located in a negative sector of the Y-axis; and detection means for detecting the first component of acceleration along the X-axis based on a change of an electrostatic capacitance in the first capacitance element and the second capacitance element and for detecting the second component of acceleration along the Y-axis based on a change of an electrostatic capacitance in the third capacitance element and the fourth capacitance element;

said method comprising the steps of:

applying a predetermined voltage across a fixed electrode and a displacement electrode facing thereto for moving the displacement electrode by a coulomb force so that the flexible substrate produces mechanical deformation, and detecting an output from said detection means while said predetermined voltage is applied.

8. A method of testing an operation of an acceleration sensor to detect a first component of acceleration along an X-axis, a second component of acceleration along a Y-axis, and a third component of acceleration along a Z-axis in an XYZ three-dimensional coordinate system, said method comprising:

providing a sensor having;

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

five capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the five displacement electrodes and the five fixed electrodes being insulated from each other so that said five capacitance elements are electrically independent from each other, wherein a first capacitance element is located in a positive sector of the X-axis, a second capacitance element is located in a negative sector of the X-axis, a third capacitance element is located in a positive sector of the Y-axis, a fourth capacitance element is located in a negative sector of the Y-axis, and a fifth capacitance element is located so as to cross the Z-axis; and detection means for detecting the first component of acceleration along the X-axis based on a change of an electrostatic capacitance in the first capacitance element and the second capacitance element, and for detecting the second component of acceleration along the Y-axis based on a change of an electrostatic capacitance in the third capacitance element and the fourth capacitance element, and for detecting the third component of acceleration along the Z-axis based on a change of an electrostatic capacitance in the fifth capacitance element;

said method further comprising:

applying a predetermined voltage across a fixed electrode and a displacement electrode facing thereto for moving the displacement electrode by a coulomb force so that the flexible substrate produces mechanical deformation, and detecting an output from said detection means while said predetermined voltage is applied.

9. A method of testing an operation of an acceleration sensor to detect a first component of acceleration along an X-axis, a second component of acceleration along a Y-axis in an XYZ three-dimensional coordinate system, said method comprising:

providing a sensor having;

a sensor casing;

a flexible substrate arranged parallel with an XY-plane of said coordinate system, said flexible substrate including a working a portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

four capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, respective electrodes of at least one of the four displacement electrodes and the four fixed electrodes being insulated from each other so that said four capacitance elements are electrically independent from each other, wherein a first capacitance element is located in a positive sector of the X-axis, a second capacitance element is located in a negative sector of the X-axis, a third capacitance element is located in a positive sector of the Y-axis, and a fourth capacitance element is located in a negative sector of the Y-axis; and detection means for detecting the first component of acceleration along the X-axis based on a change of an electrostatic capacitance in the first capacitance element and the second capacitance element and for detecting the second component of acceleration along the Y-axis based on a change of an electrostatic capacitance in the third capacitance element and the fourth capacitance element;

said method further comprising:

providing a test electrode fixed to said fixed substrate on a third plane parallel with the XY-plane, said test electrode being isolated from the fixed electrodes, and said test electrode facing one of the four displacement electrodes;

applying a predetermined voltage across said test electrode and a displacement electrode facing thereto for moving the displacement electrode by a coulomb force so that the flexible substrate produces mechanical deformation, and detecting an output from said detection means while said predetermined voltage is applied.

10. A method of testing an acceleration sensor to detect a first component of acceleration along an X-axis, a second component of acceleration along a Y-axis, and a third component of acceleration along a Z-axis in an XYZ three-dimensional coordinate system, said method comprising:

providing a sensor having;

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

five capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, respective electrodes of at least one of the five displacement electrodes and the five fixed electrodes being insulated from each other so that said five capacitance elements are electrically independent from each other, wherein a first capacitance element is located in a positive sector of the X-axis, a second capacitance element is located in a negative sector of the X-axis, a third capacitance element is located in a positive sector of the Y-axis, a fourth capacitance element is located in a negative sector of the Y-axis, and a fifth capacitance element is located so as to cross the Z-axis; and detection means for detecting the first component of acceleration along the X-axis based on a change of an electrostatic capacitance in the first capacitance element and the second capacitance element, for detecting the second component of acceleration along the Y-axis based on a change of an electrostatic capacitance in the third capacitance element and the fourth capacitance element, and for detecting the third component of acceleration along the Z-axis based on a change of electrostatic capacitance in the fifth capacitance element;

said method further comprising:

providing a test electrode fixed to said fixed substrate on a third plane parallel with the XY-plane, said test electrode being isolated from the fixed electrodes, and said test electrode facing one of the four displacement electrodes;

applying a predetermined voltage across said test electrode and a displacement electrode facing thereto for moving the displacement electrode by a coulomb force so that the flexible substrate produces mechanical deformation, and detecting an output from said detection means while said predetermined voltage is applied.

11. A method of testing an acceleration sensor to detect a first component of acceleration along an X-axis, a second component of acceleration along a Y-axis in an XYZ three-dimensional coordinate system, said method comprising:

providing a sensor having;

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

four capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the four displacement electrodes and the four fixed electrodes being insulated from each other so that said four capacitance elements are electrically independent from each other, wherein a first capacitance element is located in a positive sector of the X-axis, a second capacitance element is located in a negative sector of the X-axis, a third capacitance element is located in a positive sector of the Y-axis and a fourth capacitance element is located in a negative sector of the Y-axis; and detection means for detecting the first component of acceleration along the X-axis based on a change of an electrostatic capacitance in the first capacitance element and the second capacitance element and for detecting the second component of acceleration along the Y-axis based on a change of an electrostatic capacitance in the third capacitance element and the fourth capacitance element; and said method further comprising:

providing a test electrode fixed to said flexible substrate on a third plane parallel with the XY-plane, said test electrode being isolated from the displacement electrodes, and said test electrode facing one of the four fixed electrodes;

applying a predetermined voltage across said test electrode and a fixed electrode facing thereto for moving the test electrode by a coulomb force so that the flexible substrate produces mechanical deformation; and detecting an output from said detection means while said predetermined voltage is applied.

12. A method of testing an acceleration sensor to detect a first component of acceleration along an X-axis, a second component of acceleration along a Y-axis, and a third component of acceleration along a Z-axis in an XYZ three-dimensional coordinate system, said method comprising:

providing a sensor having;

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

five capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, the respective electrodes of at least one of the five displacement electrodes and the five fixed electrodes being insulated from each other so that said five capacitance elements are electrically independent from each other, wherein a first capacitance element is located in a positive sector of the X-axis, a second capacitance element is located in a negative sector of the X-axis, a third capacitance element is located in a positive sector of the Y-axis, a fourth capacitance element is located in a negative sector of the Y-axis, and a fifth capacitance element is located so as to cross the Z-axis; and detection means for detecting the first component of acceleration along the X-axis based on a change of an electrostatic capacitance in the first capacitance element and the second capacitance element, for detecting the second component of acceleration along the Y-axis based on a change of an electrostatic capacitance in the third capacitance element and the fourth capacitance element, and for detecting the third component of acceleration along the Z-axis based on a change of an electrostatic capacitance in the fifth capacitance element;

said method further comprising:

providing a test electrode fixed to said flexible substrate on a third plane parallel with the XY-plane, said test electrode being isolated from the displacement electrodes, and said test electrode facing one of the five fixed electrodes;

applying a predetermined voltage across said test electrode and a fixed electrode facing thereto for moving the test electrode by a coulomb force so that the flexible substrate produces mechanical deformation; and detecting an output from said detection means while said predetermined voltage is applied.

13. A method of testing an acceleration sensor to detect a first component of acceleration along an X-axis and a second component of acceleration along a Y-axis in an XYZ three-dimensional coordinate system, said method comprising:

providing a sensor having;

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

four capacitance elements, each of said capacitance elements being comprised of a displacement electrode fixed to said flexible substrate on a first plane parallel with the XY-plane and a fixed electrode fixed to said fixed substrate on a second plane parallel with the XY-plane, each displacement electrode facing each fixed electrode, and the respective electrodes of at least one of the four displacement electrodes and the four fixed electrodes being insulated from each other so that said four capacitance elements are electrically independent from each other, wherein a first capacitance element is located in a positive sector of the X-axis, a second capacitance element is located in a negative sector of the X-axis, a third capacitance element is located in a positive sector of the Y-axis and a fourth capacitance element is located in a negative sector of the Y-axis; and detection means for detecting the first component of acceleration along the X-axis based on a change of an electrostatic capacitance in the first capacitance element and the second capacitance element and for detecting the second component of acceleration along the Y-axis based on a change of an electrostatic capacitance in the third capacitance element and the fourth capacitance element; and said method further comprising:

providing a fixed test electrode fixed to said fixed substrate on a third plane parallel with the XY-plane, said fixed test electrode being isolated from the fixed electrodes;

providing a displacement test electrode to said substrate on a fourth plane parallel with the XY-plane, said displacement test electrode being isolated from the displacement electrodes, and said displacement test electrode facing said fixed test electrode;

applying a predetermined voltage across said fixed test electrode and said displacement test electrode facing thereto for moving said displacement test electrode by a coulomb force so that the flexible substrate produces mechanical deformation; and detecting an output from said detection means while said predetermined voltage is applied.

14. A method of testing an acceleration sensor to detect a first component of acceleration along an X-axis, a second component of acceleration along a Y-axis, and a third component of acceleration along a Z-axis in an XYZ three-dimensional coordinate system, said method comprising:

providing a sensor having;

a sensor casing;

a flexible substrate arranged parallel with an XY-plane of said coordinate system, said flexible substrate including a working portion to which a force is applied, a fixed portion fixed to said sensor casing, and a flexible portion having flexibility located between said working portion and said fixed portion;

a fixed substrate arranged parallel with the XY-plane so as to face said flexible substrate with a predetermined distance and fixed to said sensor casing;

a working body attached to said working portion to transmit a force produced by an acceleration to said working portion so that said flexible substrate produces mechanical deformation;

five capacitance elements, each of said capacitance elements being comprised of a displacement electrode fixed to said flexible substrate on a first plane parallel with the XY-plane and a fixed electrode fixed to said fixed substrate on second plane parallel with the XY-plane, each displacement electrode facing each fixed electrode, the respective electrodes of at least one of the five displacement electrodes and the five fixed electrodes being insulated from each other so that said five capacitance elements are electrically independent from each other, wherein a first capacitance element is located in a positive sector of the X-axis, a second capacitance element is located in a negative sector of the X-axis, a third capacitance element is located in a positive sector of the Y-axis, a fourth capacitance element is located in a negative sector of the Y-axis, and a fifth capacitance element is located so as to cross the Z-axis; and detection means for detecting the first component of acceleration along the X-axis based on a change of an electrostatic capacitance in the first capacitance element and the second capacitance element, for detecting the second component of acceleration along the Y-axis based on a change of an electrostatic capacitance in the third capacitance element and the fourth capacitance element, and for detecting the third component of acceleration along the Z-axis based on a change of an electrostatic capacitance in the fifth capacitance element; and said method further comprising:

providing a fixed test electrode fixed to said fixed substrate on a third plane parallel with the XY-plane, said fixed test electrode being isolated from the fixed electrodes;

providing a displacement test electrode fixed to said flexible substrate on a fourth plane parallel with the XY-plane, said displacement test electrode being isolated from the displacement electrodes, and said displacement test electrode facing said fixed test electrode;

applying a predetermined voltage across said fixed test electrode and said displacement test electrode facing thereto for moving said displacement test electrode by a coulomb force so that the flexible substrate produces mechanical deformation; and detecting an output from said detection means while said predetermined voltage is applied.

* * * * *